(12) United States Patent
Hyung et al.

(10) Patent No.: US 11,662,862 B2
(45) Date of Patent: May 30, 2023

(54) INPUT SENSING DEVICE AND DISPLAY DEVICE INCLUDING THE SAME

(71) Applicant: Samsung Display Co., LTD., Yongin-si (KR)

(72) Inventors: Jun Woo Hyung, Yongin-si (KR); Seung Ho Baek, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 394 days.

(21) Appl. No.: 16/795,586

(22) Filed: Feb. 20, 2020

(65) Prior Publication Data

US 2021/0019020 A1 Jan. 21, 2021

(30) Foreign Application Priority Data

Jul. 17, 2019 (KR) .......................... 10-2019-0086613

(51) Int. Cl.
  *G06F 3/047* (2006.01)
  *G06F 3/044* (2006.01)
  *G06F 3/041* (2006.01)

(52) U.S. Cl.
  CPC ............ *G06F 3/0445* (2019.05); *G06F 3/047* (2013.01); *G06F 3/0412* (2013.01); *G06F 2203/04103* (2013.01); *G06F 2203/04105* (2013.01)

(58) Field of Classification Search
  CPC ...... G06F 3/0445; G06F 3/0412; G06F 3/047; G06F 2203/04103; G06F 2203/04105; G06F 3/04164; G06F 2203/04111; G06F 3/0448; G06F 3/04144
  See application file for complete search history.

(56) References Cited

U.S. PATENT DOCUMENTS

| | | | |
|---|---|---|---|
| 2013/0194213 A1* | 8/2013 | Chou | G06F 3/0445 345/173 |
| 2014/0020484 A1* | 1/2014 | Shaw | G01L 1/146 73/862.625 |
| 2014/0197880 A1* | 7/2014 | Ng | G06F 3/0445 327/517 |
| 2014/0204043 A1* | 7/2014 | Lin | G06F 3/04164 345/173 |
| 2014/0253499 A1* | 9/2014 | Lee | G06F 3/0448 345/174 |
| 2017/0010703 A1* | 1/2017 | Chen | G02F 1/136286 |

(Continued)

FOREIGN PATENT DOCUMENTS

| | | |
|---|---|---|
| KR | 10-1870834 | 6/2018 |
| KR | 10-1932650 | 12/2018 |

*Primary Examiner* — Temesghen Ghebretinsae
*Assistant Examiner* — Sosina Abebe
(74) *Attorney, Agent, or Firm* — H.C. Park & Associates, PLC

(57) ABSTRACT

An input sensing device includes a base layer. A first electrode member includes first sensing electrodes arranged along a first direction on the base layer. Each of the first sensing electrodes includes a first opening exposing the base layer. A first pressure sensing electrode is disposed in the first opening and is insulated from the first sensing electrodes. The first pressure sensing electrode includes a first sensing cell and a second sensing cell. The first sensing cell includes first branch electrodes each extending in a third direction. The second sensing cell includes second branch electrodes each extending in a fourth direction intersecting the third direction.

17 Claims, 25 Drawing Sheets

(56) References Cited

U.S. PATENT DOCUMENTS

| | | | |
|---|---|---|---|
| 2017/0010719 A1* | 1/2017 | Chen | G06F 3/0446 |
| 2017/0068368 A1* | 3/2017 | Hsiao | G06F 3/0445 |
| 2017/0115781 A1* | 4/2017 | Zeng | H10K 59/131 |
| 2017/0192582 A1* | 7/2017 | Pan | G06F 3/04166 |
| 2017/0242518 A1* | 8/2017 | Liu | G06F 3/0412 |
| 2017/0371471 A1 | 12/2017 | Kim et al. | |
| 2018/0052544 A1* | 2/2018 | Han | G01L 1/14 |
| 2018/0182838 A1* | 6/2018 | Yeo | H01L 27/3288 |
| 2018/0224984 A1 | 8/2018 | Kim et al. | |
| 2018/0329555 A1 | 11/2018 | Kim et al. | |
| 2020/0387279 A1* | 12/2020 | Kim | G06F 3/04886 |
| 2021/0223915 A1* | 7/2021 | Wang | G06F 3/0443 |

\* cited by examiner

INPUT SENSING DEVICE AND DISPLAY DEVICE INCLUDING THE SAME

CROSS-REFERENCE TO RELATED APPLICATION

This application claims priority from and the benefit of Korean patent application No. 10-2019-0086613, filed on Jul. 17, 2019, which is hereby incorporated by reference for all purposes as if fully set forth herein.

BACKGROUND

Filed

Exemplary embodiments/implementations of the invention relate generally to an input sensing device and display device including the same.

Discussion of the Background

Electronic devices that provide images to users, such as a smartphone, a digital camera, a notebook computer, a navigation system, and a smart television, include display devices configured to display images and various input devices.

An electronic device may include a touch sensor configured to recognize a touch input as an input device, and the touch sensor is integrally formed with a display device.

Recently, research has been conducted using a pressure sensor for detecting a magnitude of a touch pressure in substitution for the existing physical buttons, by applying the pressure sensor to electronic devices (or display devices), in addition to a touch sensor for detecting a touch position.

The above information disclosed in this Background section is only for understanding of the background of the inventive concepts, and, therefore, it may contain information that does not constitute prior art.

SUMMARY

Exemplary embodiments provide an input sensing device capable of being implemented in a thin type while having a function of pressure sensing, and a display device including the input sensing device.

Exemplary embodiments also provide an input sensing device capable of improving the recognition accuracy of a touch pressure, and a display device including the input sensing device.

Additional features of the inventive concepts will be set forth in the description which follows, and in part will be apparent from the description, or may be learned by practice of the inventive concepts.

An exemplary embodiment of the present invention provides an input sensing device including: a base layer; a first electrode member including first sensing electrodes arranged along a first direction on the base layer, the first sensing electrodes being electrically connected to each other along the first direction. Each of the first sensing electrodes includes a first opening exposing the base layer; a second electrode member including second sensing electrodes arranged along a second direction intersecting the first direction on the base layer, the second sensing electrodes being electrically connected to each other along the second direction; and a first pressure sensing electrode disposed in the first opening, the first pressure sensing electrode being insulated from the first sensing electrodes and the second sensing electrodes. The first pressure sensing electrode includes a first sensing cell and a second sensing cell. The first sensing cell includes first branch electrodes each extending in a third direction, the first branch electrodes being arranged in parallel with each other, and the second sensing cell includes second branch electrodes each extending in a fourth direction intersecting the third direction, the second branch electrodes being arranged in parallel with each other.

The first branch electrodes may be connected in series to each other in the first sensing cell, and the second branch electrodes may be connected in series to each other in the second sensing cell.

The third direction may intersect each of the first direction and the second direction, and the fourth direction may intersect each of the first direction, the second direction, and the third direction.

The fourth direction may be substantially perpendicular to the third direction.

The first sensing cell and the second sensing cell may be connected in series to each other.

The first pressure sensing electrode may further include a third sensing cell and a fourth sensing cell. The third sensing cell may include third branch electrodes each extending in the third direction, the third branch electrodes being arranged in parallel with each other, and the fourth sensing cell may include fourth branch electrodes each extending in the fourth direction, the fourth branch electrodes being arranged in parallel with each other.

The first opening may include first to fourth cell regions distinguished from each other by a first reference line and a second reference line, which pass an area center of the first pressure sensing electrode. The first to fourth sensing cells may be respectively disposed in the first to fourth cell regions.

The first to fourth sensing cells may be sequentially located along a first rotational direction with respect to the area center.

The third sensing cell and the fourth sensing cell may be respectively symmetrical with the second sensing cell and the first sensing cell with respect to the first reference line or the second reference line.

The first to fourth sensing cells may be sequentially connected in series.

The third sensing cell may be connected to the second sensing cell through an adjacent pressure sensing electrode adjacent to the first pressure sensing electrode.

The fourth sensing cell may be connected between the second sensing cell and the third sensing cell.

The input sensing device may include a second pressure sensing electrode disposed in a second opening of each of the second sensing electrodes, the second pressure sensing electrode being insulated from the first sensing electrodes and the second sensing electrodes. The second pressure sensing electrode may include the first sensing cell and the second sensing cell.

The third direction may be identical to the first direction, and the fourth direction may be identical to the second direction.

The first pressure sensing electrode may further include a third sensing cell and a fourth sensing cell. The third sensing cell may include third branch electrodes each extending in the third direction, the third branch electrodes being arranged in parallel with each other, and the fourth sensing cell may include fourth branch electrodes each extending in the fourth direction, the fourth branch electrodes being arranged in parallel with each other. The first to fourth sensing cells may be rotationally symmetrical with each other with respect to an area center of the first opening.

The input sensing device may further include: a first conductive layer provided on the base layer; a second conductive layer provided on the first conductive layer; and a third conductive layer provided on the second conductive layer. The first conductive layer may include the first electrode member, the second electrode member, the first pressure sensing electrode, and a first connection electrode connecting two adjacent first sensing electrodes among the first sensing electrodes. The second conductive layer may include a second connection electrode connecting two adjacent second sensing electrodes among the second sensing electrodes. The third conductive layer may include first and second connection patterns connecting the first pressure sensing electrode to an adjacent pressure sensing electrode adjacent to the first pressure sensing electrode.

The first sensing cell of the first pressure sensing electrode may be connected to a first sensing cell of the adjacent pressure sensing electrode through the first connection pattern, and the second sensing cell of the first pressure sensing electrode may be connected to a second sensing cell of the adjacent pressure sensing electrode through the second connection pattern.

The input sensing device may further include: a first conductive layer provided on the base layer; a second conductive layer provided on the first conductive layer; and a third conductive layer provided on the second conductive layer. The first conductive layer may include the first electrode member, the second electrode member, the first pressure sensing electrode, and a first connection electrode connecting the first sensing electrodes. The second conductive layer may include a first connection pattern connecting the first pressure sensing electrode to an adjacent pressure sensing electrode adjacent to the first pressure sensing electrode. The third conductive layer may include a second connection electrode connecting the second sensing electrodes.

The input sensing device may further include: a first conductive layer provided on the base layer; a second conductive layer provided on the first conductive layer; and a third conductive layer provided on the second conductive layer. The first conductive layer may include the first electrode member, the second electrode member, a first connection electrode connecting two adjacent first sensing electrodes among the first sensing electrode, and the first pressure sensing electrode. The second conductive layer may include a second connection electrode connecting two adjacent second sensing electrodes among the second sensing electrodes. The third conductive layer may include a first connection pattern connecting the first pressure sensing electrode to an adjacent pressure sensing electrode adjacent to the first pressure sensing electrode.

Another exemplary embodiment of the present invention provides a display device including: a base substrate; a light emitting element disposed on the base substrate; a thin film encapsulation disposed over the light emitting element; and a first electrode layer disposed on the thin film encapsulation. The first electrode layer includes: a first electrode member including first sensing electrodes arranged along a first direction, the first sensing electrodes being electrically connected to each other along the first direction. Each of the first sensing electrodes includes a first opening exposing the base substrate; a second electrode member including second sensing electrodes arranged along a second direction intersecting the first direction, the second sensing electrodes being electrically connected to each other along the second direction; and a first pressure sensing electrode disposed in the first opening, the first pressure sensing electrode being insulated from the first sensing electrodes and the second sensing electrodes. The first pressure sensing electrode includes a first sensing cell and a second sensing cell. The first sensing cell includes first branch electrodes each extending in a third direction, the first branch electrodes being arranged in parallel with each other, and the second sensing cell includes second branch electrodes each extending in a fourth direction intersecting the third direction, the second branch electrodes being arranged in parallel with each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 11 is a view illustrating an example of a second layer in the sensor shown in

FIG. 5.

DETAILED DESCRIPTION

Figure 1:
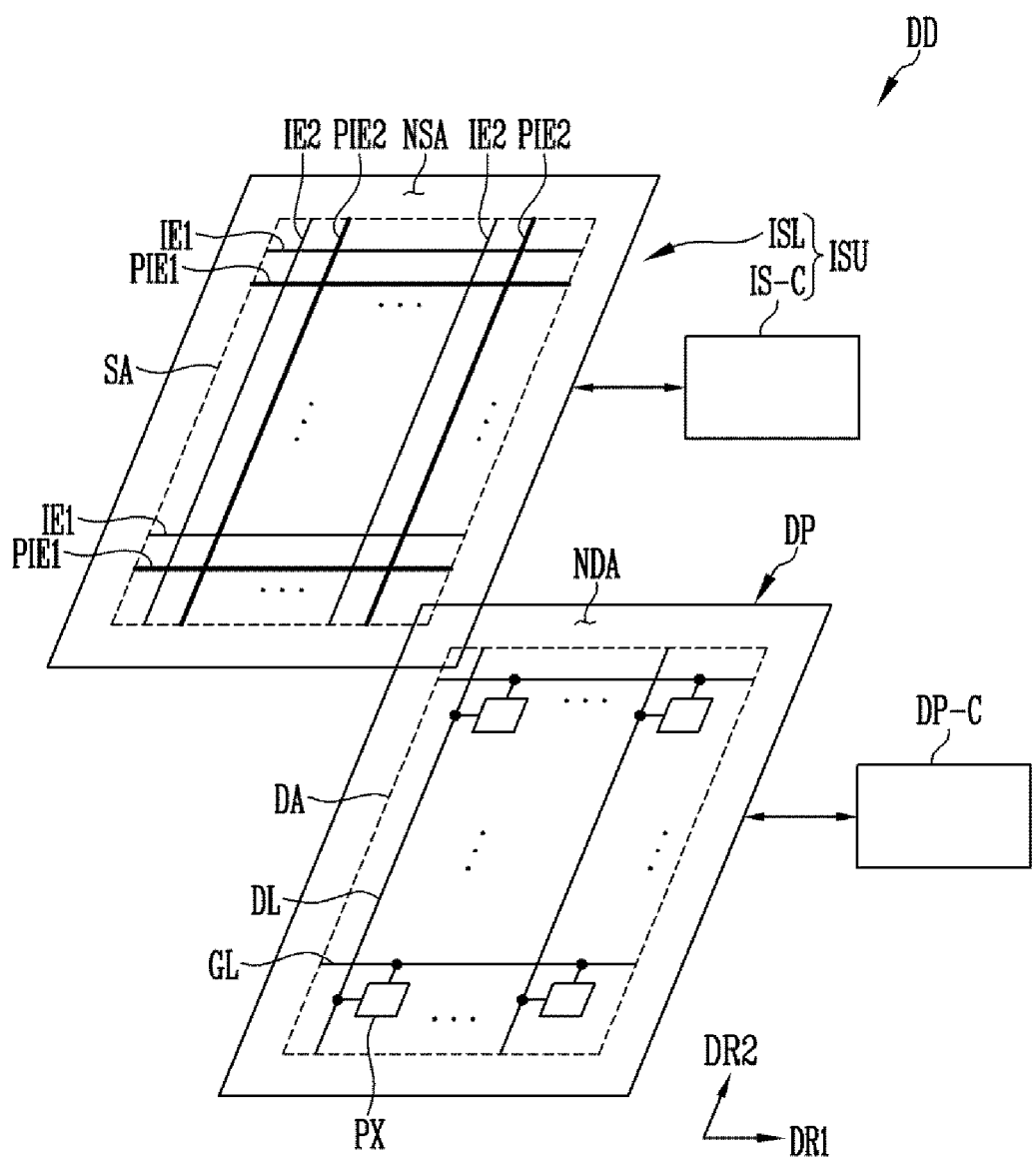
FIG. 1 is a view illustrating a display device according to exemplary embodiments of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The present invention may apply various changes and different shape, therefore only illustrate in details with particular examples. However, the examples are not limit to certain shapes, but apply to all the change and equivalent material and replacement.

Figure 2:
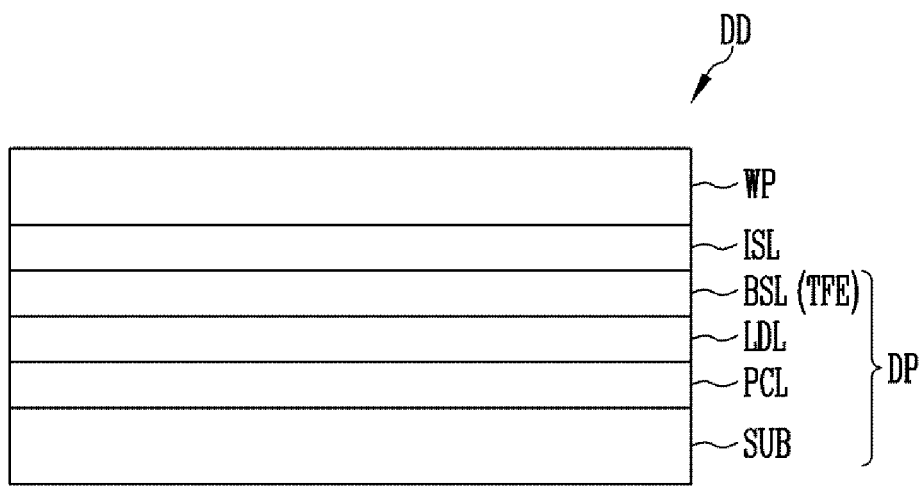
FIG. 2 is a sectional view illustrating an example of the display device shown in FIG. 1.
Figure 3:
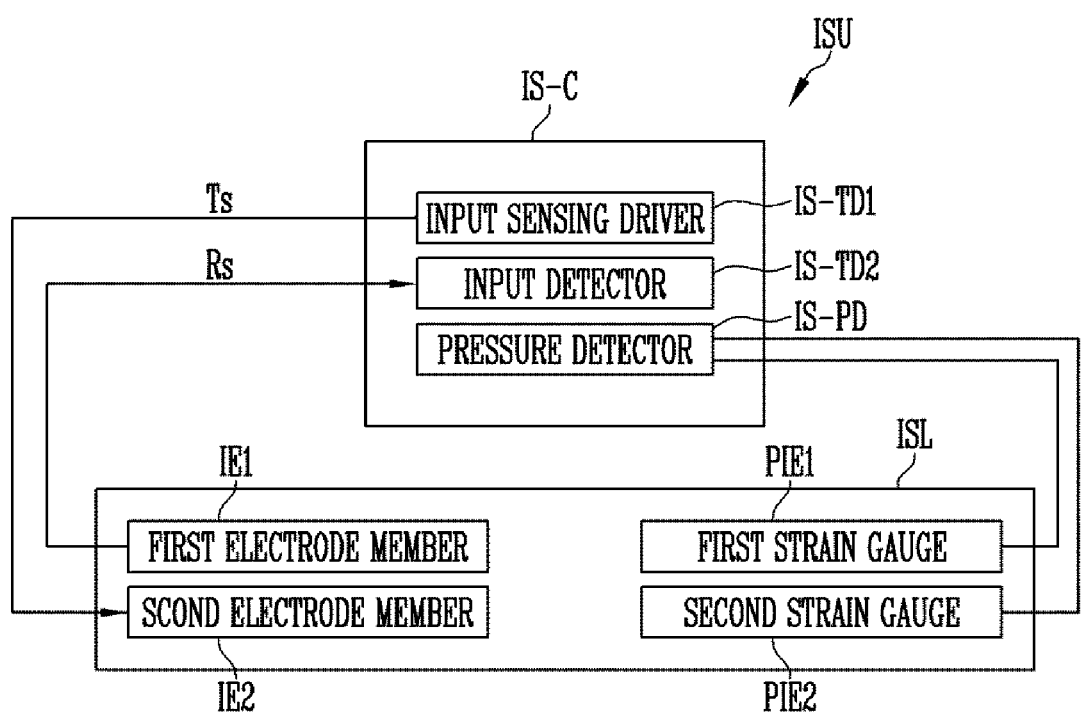
FIG. 3 is a block diagram illustrating an example of an input sensing device included in the display device shown in FIG. 1.

FIG. 1 is a view illustrating a display device according to exemplary embodiments of the present invention. FIG. 2 is a sectional view illustrating an example of the display device shown in FIG. 1. FIG. 3 is a block diagram illustrating an example of an input sensing device included in the display device shown in FIG. 1.

Referring to FIGS. 1 and 3, the display device DD may include an input sensing device ISU (or touch sensor), a display panel DP, and a display controller DP-C (or panel driver). The input sensing device ISU may include a sensor ISL (or input sensor or input sensing layer) and an input sensing controller IS_C.

Although a case where the sensor ISL is separated from the display panel DP is illustrated in FIG. 1, this is merely for convenience of description, and the sensor ISL is not limited thereto. For example, the sensor ISL may be integrally formed with the display panel DP, or be directly formed on the display panel DP by using the display panel DP as a substrate.

The display panel DP may include a display region DA and a non-display region NDA surrounding at least one region of the display region DA.

As shown in FIG. 2, the display panel DP may include a base substrate SUB, a pixel circuit layer PCL disposed on the base substrate SUB, and a light emitting element layer LDL disposed on the pixel circuit layer PCL. The pixel circuit layer PCL may include scan lines GL, data lines DL, and thin film transistors, which drive the light emitting element layer LDL. The scan lines GL and the data lines DL may be provided in the display region DA of the pixel circuit layer PCL, and various driving signals for driving pixels PX and/or lines for supplying driving power may be provided in the non-display region NDA of the pixel circuit layer PCL.

In an exemplary embodiment, the display panel DP may be an Organic Light Emitting Diode display panel (OLED panel). However, the display panel DP is not limited thereto. For example, the display panel DP may be a self-luminescent display panel, such as a Quantum dot Light Emitting Diode display panel (QLED panel) or a micro Light Emitting Diode display panel (micro LED panel). In another example, the display panel DP may be a non-self-luminescent display panel such as a Liquid Crystal Display panel (LCD panel), an Electro-Phoretic Display panel (EPD panel), or an Electro-Wetting Display panel (EWD panel). When the display panel DP is a non-self-luminescent display panel, the display device DD may include a backlight unit for supplying light to the display panel DP. Hereinafter, for convenience of description, a case where the display panel DP is an OLED panel will be described as an example.

The display controller DP-C may be electrically connected to the display panel DP, and supply a signal necessary for driving of the display panel DP.

The display controller DP-C may include at least one of a scan driver for supplying a scan signal to the scan lines GL, a data driver for supplying a data signal to the data lines DL, and a timing controller for driving the scan driver and the data driver. In some exemplary embodiments, the scan driver, the data driver, and/or the timing controller may be implemented with a single Integrated Circuit (IC), but the scan driver, the data driver, and the timing controller are not limited thereto. For example, at least one of the scan driver, the data driver, and the timing controller may be integrated or mounted on the display panel DP.

The sensor ISL may be provided on at least one region of the display panel DP. For example, the sensor ISL may be disposed on one surface (e.g., an upper surface) in a direction in which an image is emitted, which is selected from both surfaces of the display panel DP. The sensor ISL may be directly formed on at least one surface selected from both the surfaces of the display panel DP, or be formed in the display panel DP. For example, the sensor ISL may be directly formed on an outer surface of an upper substrate (e.g., a thin film encapsulation) or lower substrate of the display panel DP (e.g., an upper surface of the upper substrate or a lower surface of the lower substrate), or be directly formed on an inner surface of the upper substrate or the lower substrate (e.g., a lower surface of the upper substrate or an upper surface of the lower substrate).

The sensor ISL may include a sensing region SA in which a touch input can be sensed and a peripheral region NSA surrounding at least a portion of the sensing region SA. The sensing region SA may be disposed to correspond to the display region DA of the display panel DP, and the peripheral region NSA may be disposed to correspond to the non-display region NDA of the display panel DP. For example, the sensing region SA of the sensor ISL may overlap with the display region DA of the display panel DP, and the peripheral region NSA of the sensor ISL may overlap with the non-display region NDA of the display panel DP.

A first electrode member IE1 and a second electrode member IE2, which detect a touch input, may be provided in the sensing region SA of the sensor ISL.

The first electrode member IE1 may extend in a first direction DR1, and be repeatedly disposed along a second direction DR2 intersecting the first direction DR1. That is, the first electrode member IE1 may form an electrode row along the second direction DR2.

The second electrode member IE2 may extend in the second direction DR2, and be repeatedly disposed along the first direction DR1. The second electrode member IE2 may be insulated from the first electrode member IE1.

The shape, size, and/or arrangement direction of the first and second electrode members IE1 and IE2 are not particularly limited. A detailed configuration of the first and second electrode members IE1 and IE2 will be described later with reference to FIG. 4.

The first electrode member IE1 and the second electrode member IE2 may be electrically connected to the input sensing controller IS-C. The second electrode member IE2 may receive a driving signal Ts for touch detection from the input sensing controller IS-C, and the first electrode member IE1 may output a sensing signal Rs for touch detection to the input sensing controller IS-C.

In some exemplary embodiments, a first pressure electrode member PIE1 (or first strain gauge) for detecting a touch pressure and a second pressure electrode member PIE2 (or second strain gauge) for detecting a touch pressure may be provided in the sensing region SA of the sensor ISL. When a force is applied to each of the first pressure electrode member PIE1 and the second pressure electrode member PIE2 from the outside, the length or sectional area of each of the first pressure electrode member PIE1 and the second pressure electrode member PIE2 is changed, and therefore, the resistance value of each of the first pressure electrode member PIE1 and the second pressure electrode member PIE2 may be changed. The first pressure electrode member PIE1 and the second pressure electrode member PIE2 may be disposed to be spaced apart from the first electrode member IE1 and the second electrode member IE2, and be insulated from the first electrode member IE1 and the second electrode member IE2.

Similar to the first electrode member IE1, the first pressure electrode member PIE1 may extend along the first direction DR1, and be repeatedly disposed along the second direction DR2. Similar to the second electrode member IE2, the second pressure electrode member PIE2 may extend along the second direction DR2, and be repeatedly disposed along the first direction DR1.

The input sensing controller IS-C may be electrically connected to the sensor ISL to supply a driving signal Ts, and detect a touch position by receiving a sensing signal Rs corresponding to the driving signal Ts. Also, the input sensing controller IS-C may be electrically connected to the first pressure electrode member PIE1 and the second pressure electrode member PIE2 to detect a touch pressure.

In some exemplary embodiments, the input sensing controller IS-C may include a touch driver IS-TD1 (or input sensing driver), a touch detector IS-TD2 (or input detector), and a pressure detector IS-PD.

As shown in FIG. 3, the touch driver IS-TD1 may provide a driving signal Ts for detecting a touch input to the second electrode member IE2.

The touch detector IS-TD2 may detect a touch input and/or a position of the touch input by receiving a sensing signal Rs corresponding to the driving signal Ts from the first electrode member IE1. The sensing signal Rs may be a variation in mutual capacitance generated between the first electrode member IE1 and the second electrode member IE2. For example, when a touch input occurs, capacitance may be changed at a point at which the touch input is provided or at the periphery of the point. The touch detector IS-TD2 may receive, as the sensing signal Rs, a variation in mutual capacitance between the first electrode member IE1 and the second electrode member IE2, and detect a touch input and/or a position of the touch input by using the received variation. However, the touch detection method is not limited to that using the variation in mutual capacitance, and the touch detector IS-TD2 may detect a touch input by using a variation in self-capacitance.

The touch detector IS-TD2 may include at least one amplifying circuit for amplifying the received sensing signal Rs, an analog-digital converter connected to an output terminal of the amplifying circuit, and a processor.

The pressure detector IS-PD may be electrically connected to the first pressure electrode member PIE1 and the second pressure electrode member PIE2, and detect a touch pressure, based on changes in resistance values of the first pressure electrode member PIE1 and the second pressure electrode member PIE2. The pressure detector IS-PD may include a Wheatstone bridge circuit electrically connected to the first pressure electrode member PIE1 or the second pressure electrode member PIE2. The number of Wheatstone bridge circuits provided corresponds to the first and second pressure electrode members PIE1 and PIE2. A detailed configuration of the Wheatstone bridge will be described later with reference to FIG. 24.

The touch driver IS-TD1, a touch detector IS-TD2, and the pressure detector IS-PD may be integrated in a single IC, but the touch driver IS-TD1, a touch detector IS-TD2, and the pressure detector IS-PD are not limited thereto. For example, the touch driver IS-TD1 and the touch detector IS-TD2 may be integrated in a single IC, and the pressure detector IS-PD may be located at another portion instead of the inside of the touch IC. For example, the pressure detector IS-PD may be disposed on the display panel DP, or be disposed on a separate flexible printed circuit board.

A protective layer WP may be disposed on the top of the sensor ISL. For example, the protective layer WP may include a window. The protective layer WP may be attached onto the sensor ISL by an optically clear adhesive, etc.

The display device DD may further include an optical member. For example, an optical member such as a polarizing film may be interposed between the sensor ISL and the protective layer WP.

Hereinafter, the input sensing device ISU will be described in detail with reference to FIGS. 4 to 15.

Figure 4:
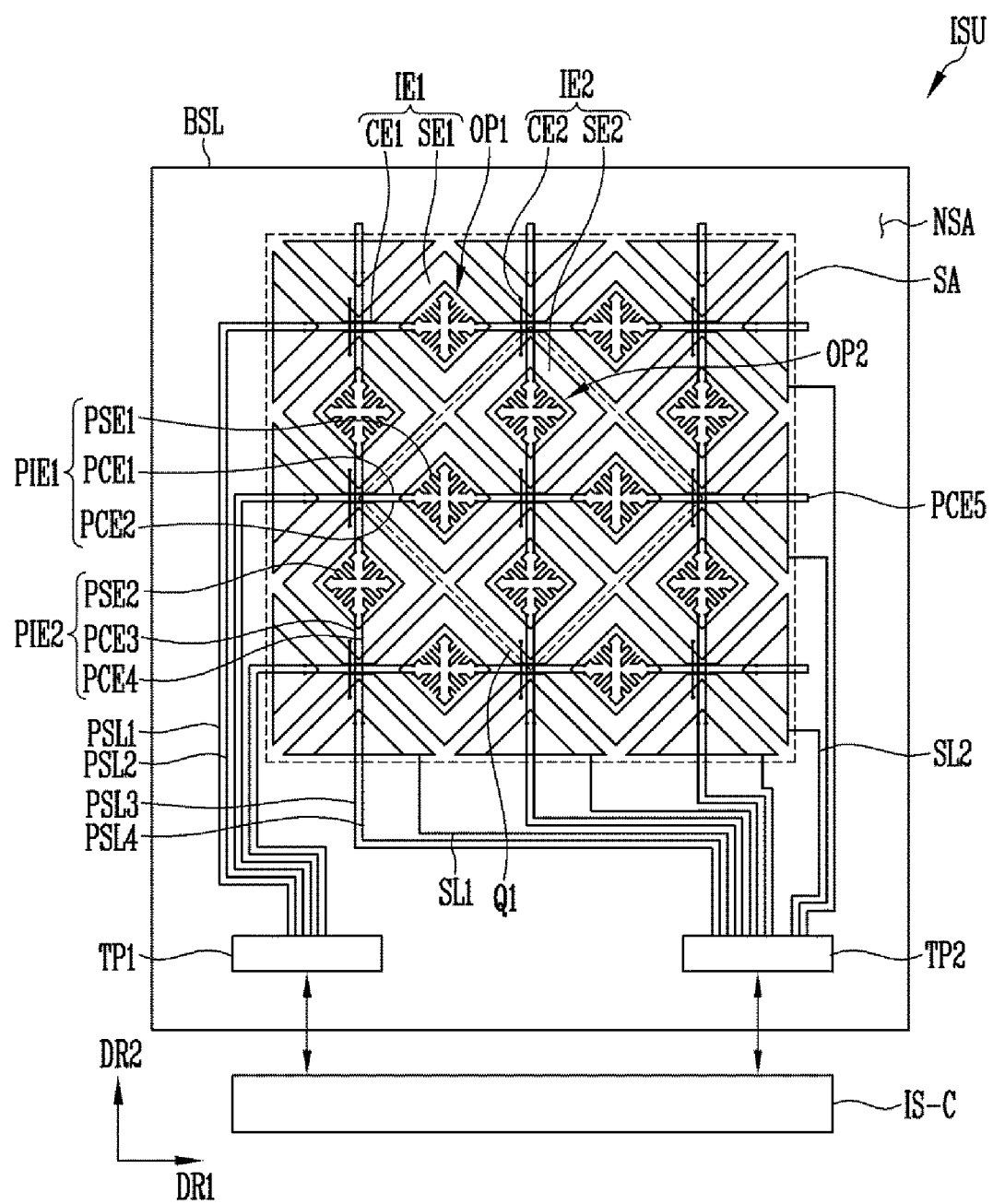
FIG. 4 is a plan view illustrating an example of the input sensing device included in the display device shown in FIG. 1.
Figure 5:
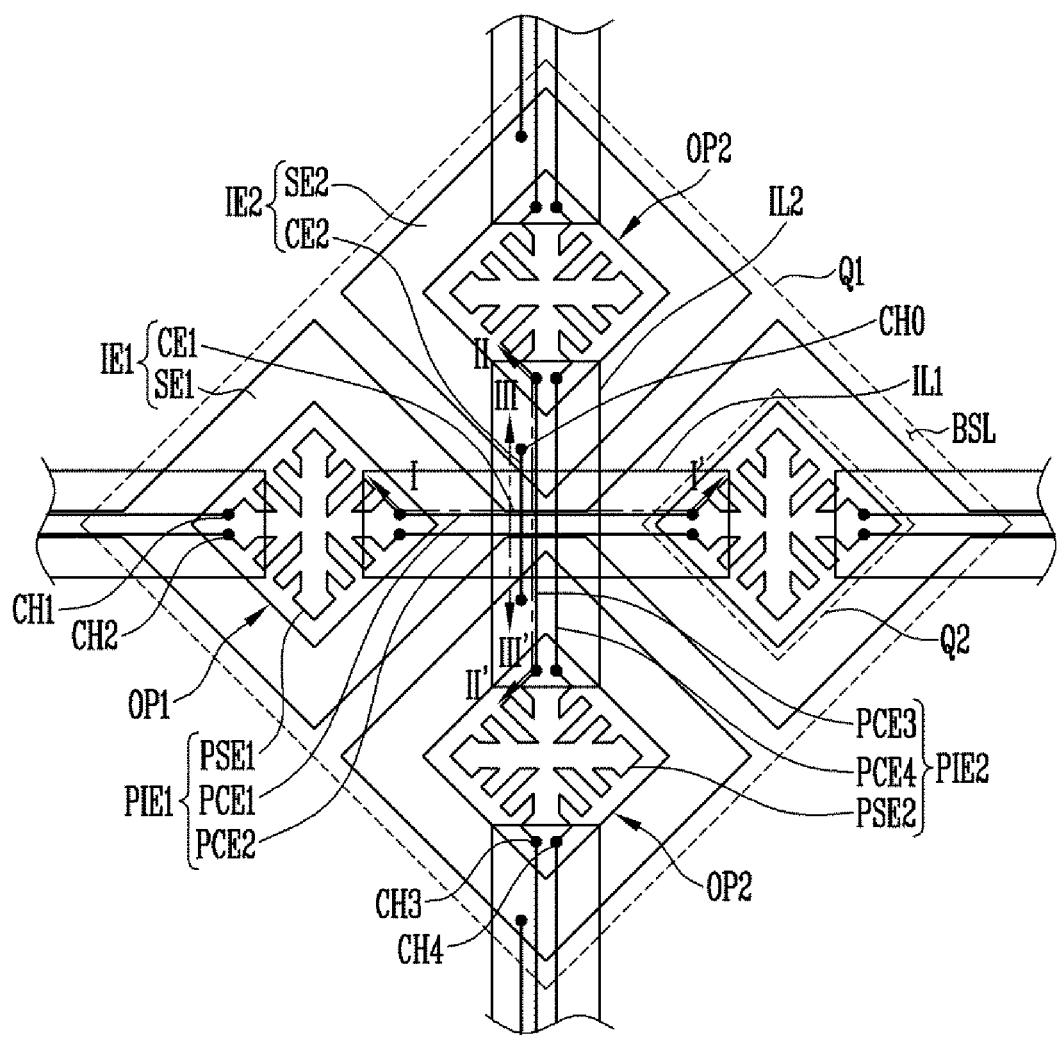
FIG. 5 is an enlarged view of portion Q1 shown in FIG. 4.
Figure 6:
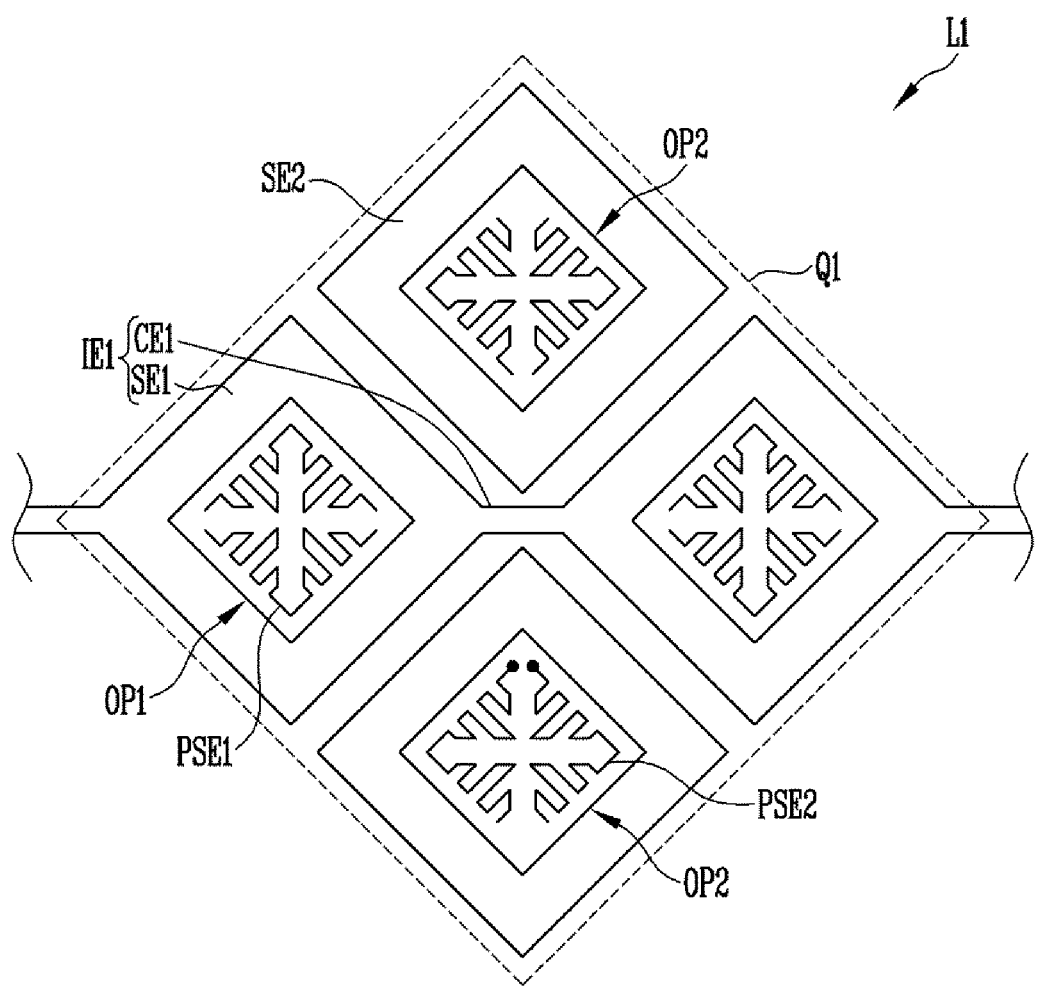
FIG. 6 is a view illustrating an example of a first layer in a sensor shown in FIG. 5.
Figure 7:
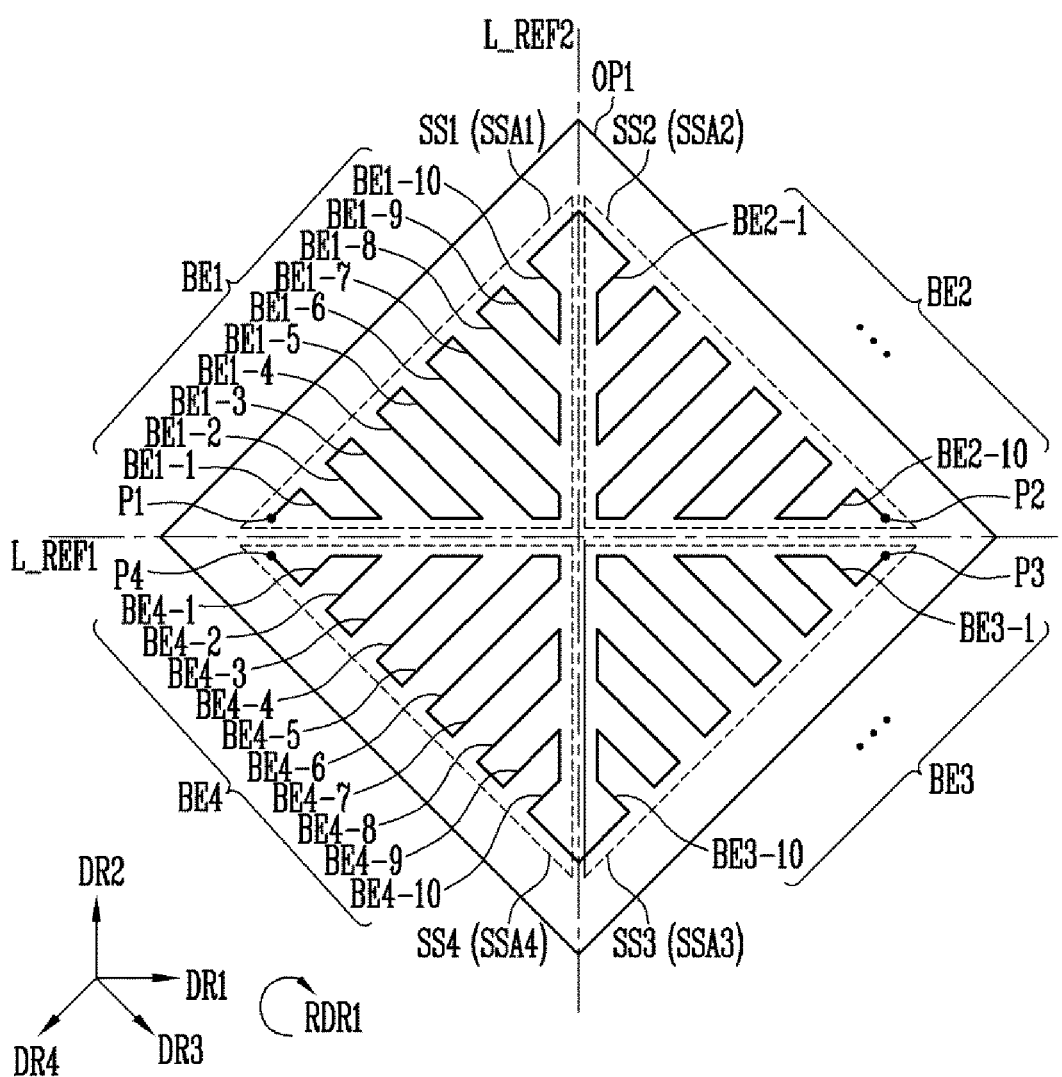
FIG. 7 is an enlarged view of portion Q2 shown in FIG. 5.
Figure 8:
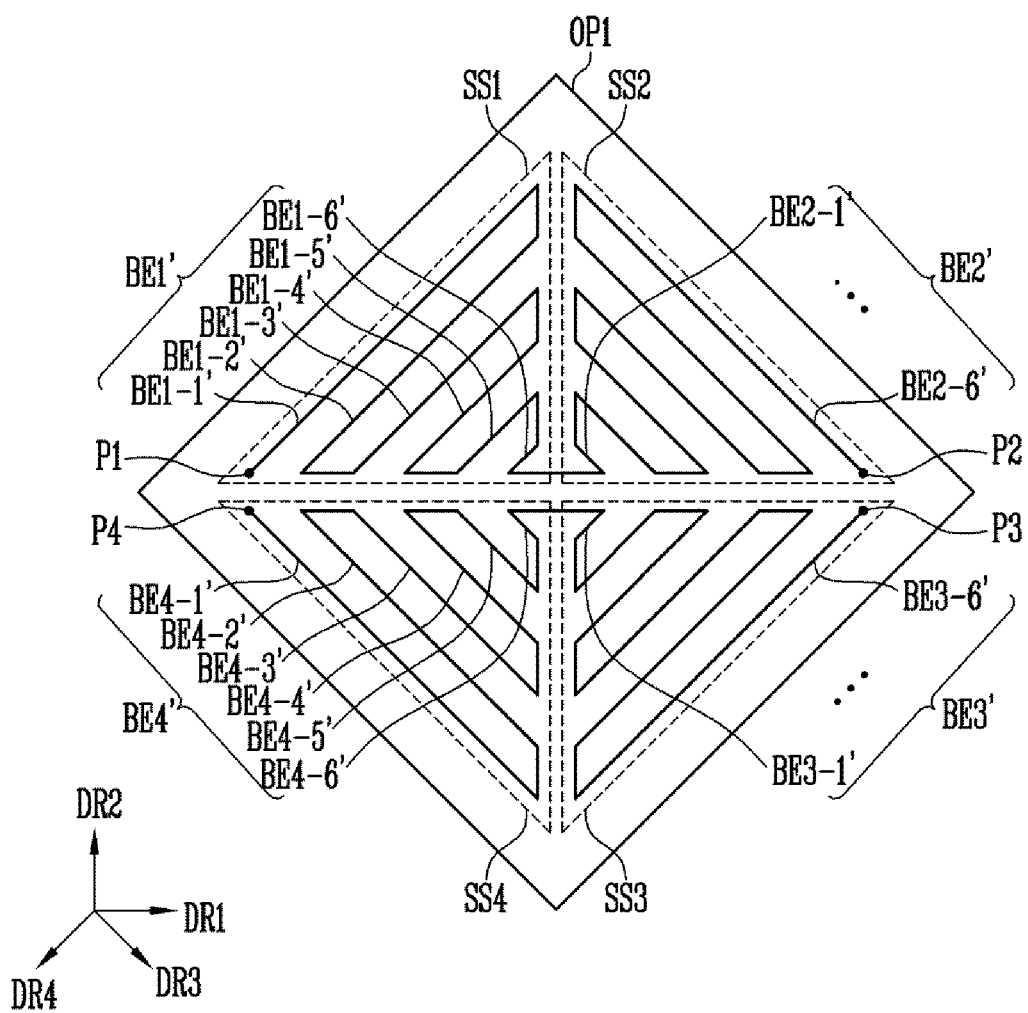
FIGS. 8 and 9 are views illustrating an example of a pressure sensing electrode shown in FIG. 7.
Figure 9:
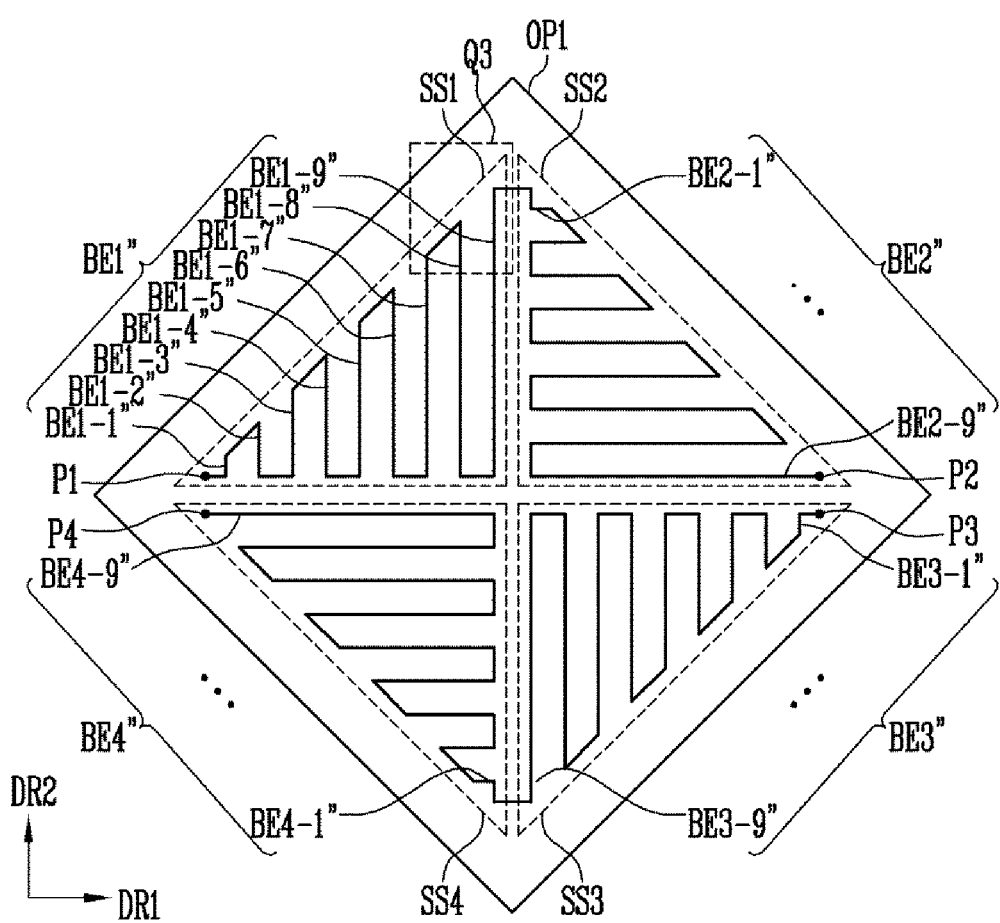
Figure 10:
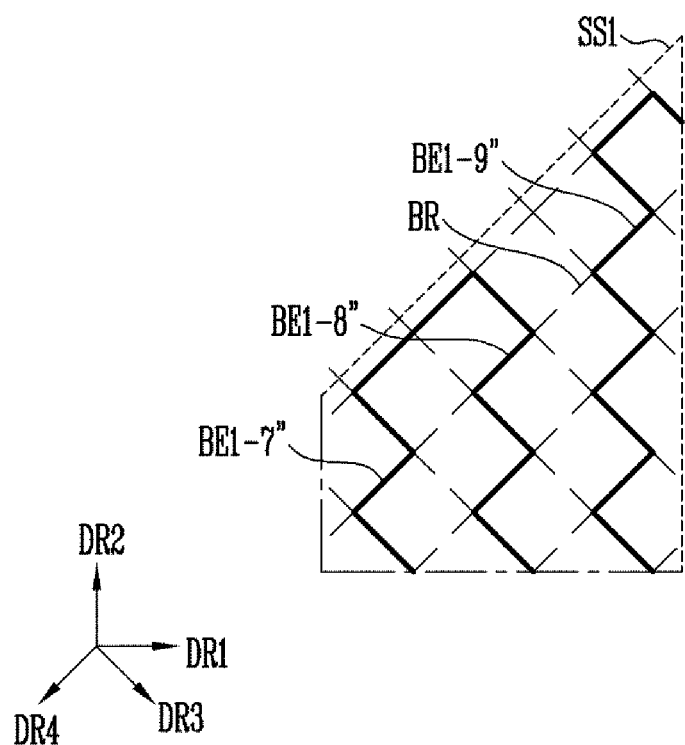
FIG. 10 is an enlarged view of portion Q3 shown in FIG. 9.
Figure 11:
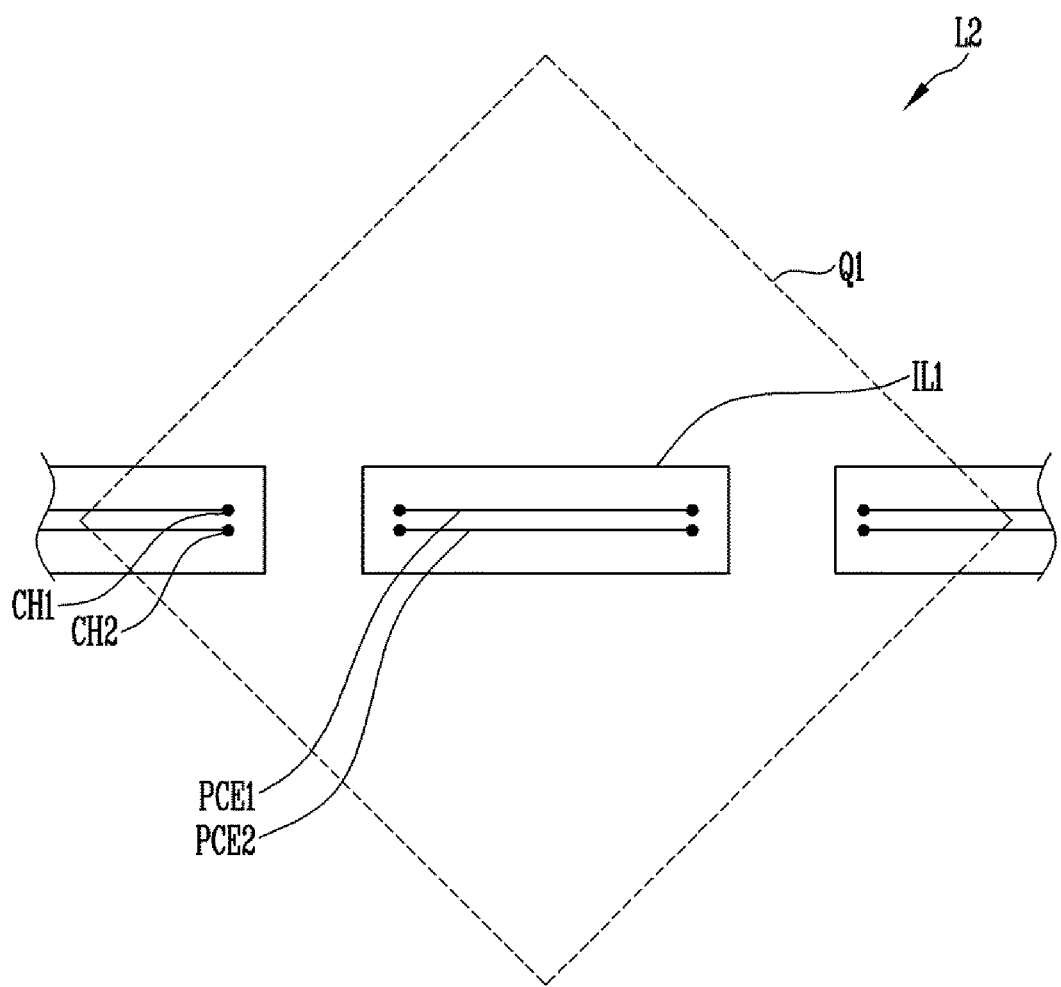
Figure 12:
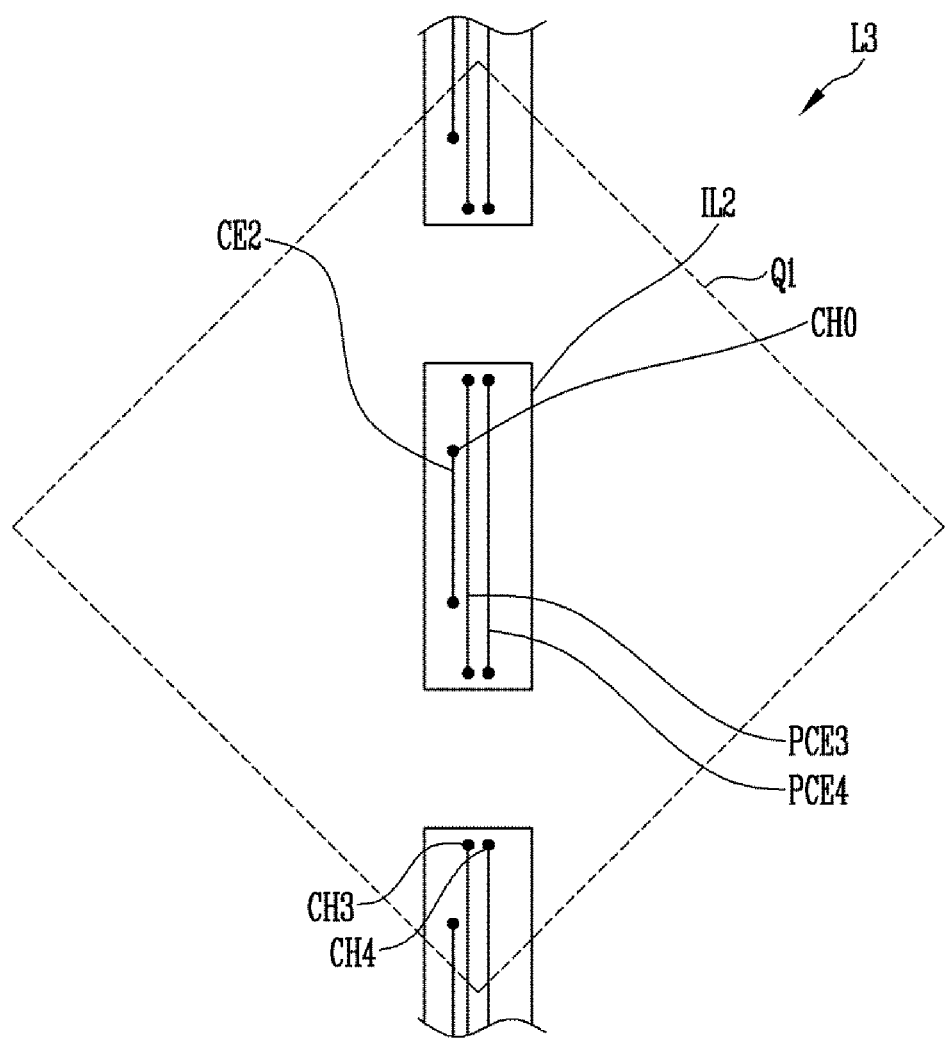
FIG. 12 is a view illustrating an example of the second layer in the sensor shown in FIG. 5.
Figure 13:
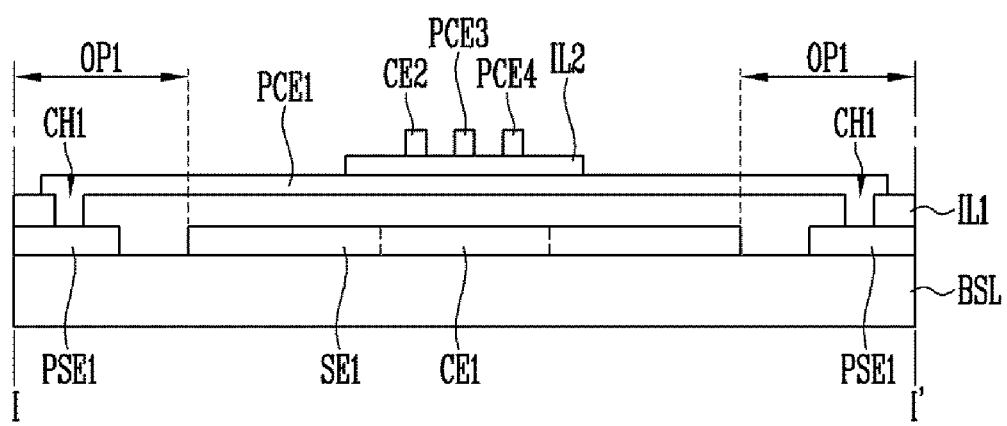
FIG. 13 is a sectional view illustrating an example of the sensor taken along line I-I' shown in FIG. 5.
Figure 14:
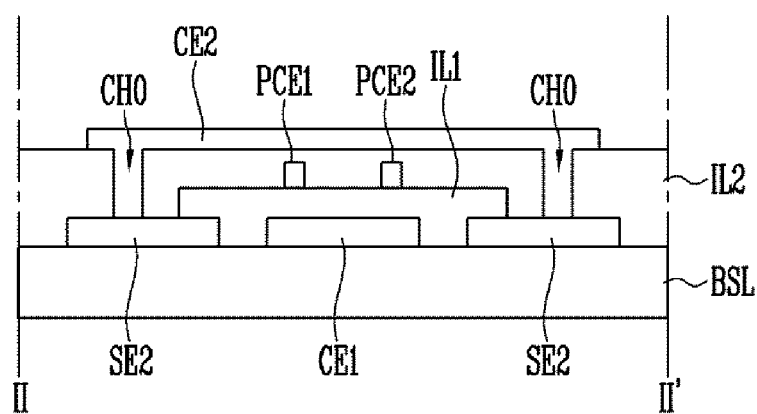
FIG. 14 is a sectional view illustrating an example of the sensor taken along line II-IF shown in FIG. 5.
Figure 15:
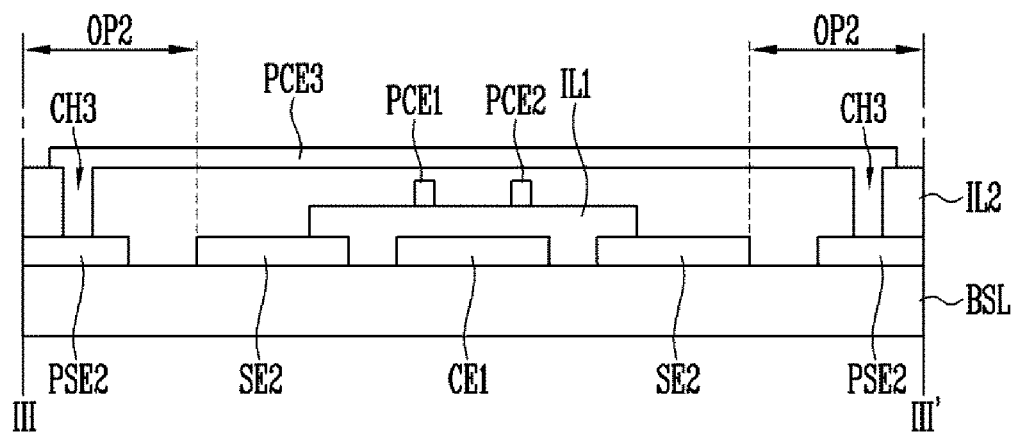
FIG. 15 is a sectional view illustrating an example of the sensor taken along line shown in FIG. 5.

FIG. 4 is a plan view illustrating an example of the input sensing device included in the display device shown in FIG. 1. FIG. 5 is an enlarged view of portion Q1 shown in FIG. 4. FIG. 6 is a view illustrating an example of a first layer in a sensor shown in FIG. 5. FIG. 7 is an enlarged view of portion Q2 shown in FIG. 5. FIGS. 8 and 9 are views illustrating an example of a pressure sensing electrode shown in FIG. 7. FIG. 10 is an enlarged view of portion Q3 shown in FIG. 9. FIG. 11 is a view illustrating an example of a second layer in the sensor shown in FIG. 5. FIG. 12 is a view illustrating an example of the second layer in the sensor shown in FIG. 5. FIG. 13 is a sectional view illustrating an example of the sensor taken along line I-I' shown in FIG. 5. FIG. 14 is a sectional view illustrating an example of the sensor taken along line shown in FIG. 5. FIG. 15 is a sectional view illustrating an example of the sensor taken along line shown in FIG. 5.

Referring to FIGS. 4 to 15, the input sensing device ISU (or input sensing layer ISL) may include a base layer BSL and electrodes disposed on the base layer BSL. The electrodes may include a first electrode member IE1, a second electrode member IE2, a first pressure electrode member PIE1, and a second pressure electrode member PIE2.

The base layer BSL may include a sensing region SA and a peripheral region NSA. The base layer BSL is a layer that becomes a substrate of the electrodes. In some exemplary embodiments, the base layer BSL may be one of layers constituting the display panel DP. For example, the base layer BSL may be a Thin Film Encapsulation (TFE) layer of the display panel DP.

As described with reference to FIG. 1, the first electrode member IE1 may extend in the first direction DR1, and be repeatedly disposed along the second direction DR2. Although a case where three first electrode members IE1 are disposed along the second direction DR2 is illustrated as an example in FIG. 4, the first electrode members IE1 are not limited thereto, and the number of first electrode members IE1 may be variously modified.

The first electrode member IE1 may include a first sensing electrode SE1 and a first connection electrode CE1. The first sensing electrode SE1 may be may be repeatedly disposed along the first direction DR1, and the first connection electrode CE1 may connect the first sensing electrode SE1 to an adjacent sensing electrode in the first direction DR1. In the following exemplary embodiments, the term "connection" may inclusively mean "connection" in a physical aspect and/or an electrical aspect.

The first sensing electrode SE1 may be disposed in a first layer L1. The first sensing electrode SE1 (and a second sensing electrode SE2) may have a rhombus shape. However, the first sensing electrode SE1 is not limited thereto, and the shape of the first sensing electrode SE1 may be modified into various shapes such as a triangular shape, a quadrangular shape, a pentagonal shape, a circular shape, and a bar shape.

The first sensing electrode SE1 may include a conductive material. The conductive material includes metals or alloys thereof, and may include gold (Au), silver (Ag), aluminum (Al), molybdenum (Mo), chromium (Cr), titanium (Ti), nickel (Ni), neodymium (Nd), copper (Cu), platinum (Pt), and the like. Also, the first sensing electrode SE1 may be made of a transparent conductive material.

The transparent conductive material may include silver nano wire (AgNW), Indium Tin Oxide (ITO), Indium Zinc Oxide (IZO), Antimony Zinc Oxide (AZO), Indium Tin Zinc Oxide (ITZO), Zinc Oxide (ZnO), Tin Oxide ($SnO_2$), carbon nano tube, graphene, and the like.

The first sensing electrode SE1 may be formed in a single-layered structure or multi-layered structure. When the first sensing electrode SE1 is formed in the multi-layered structure, the first sensing electrode SE1 may include multi-layered metal layers. For example, the first sensing electrode SE1 may have a triple-layered structure of titanium/aluminum/titanium.

Also, the first sensing electrode SE1 (and the second sensing electrode SE2) may have a mesh structure. When the first sensing electrode SE1 is formed to have a mesh structure, the first sensing electrode SE1 may be disposed not to overlap with an emission region of the display panel. That is, the first sensing electrode SE1 having the mesh structure may include a mesh hole overlapping with the emission region. The first sensing electrode SE1 having the mesh structure will be described with reference to FIG. 21.

In some exemplary embodiments, the first sensing electrode SE1 may include a first opening OP1. For example, at least a central portion of each first sensing electrode SE1 may be opened, to expose a layer disposed under the first sensing electrode SE1. For example, when the base layer BSL is disposed under the first sensing electrode SE1, the base layer BSL may be exposed through the first opening OP1.

The first connection electrode CE1 may connect the first sensing electrode SE1 to an adjacent sensing electrode in the first direction DR1. The connection electrode CE1 may be disposed in the same layer L1 as the first sensing electrode SE1, but the connection electrode CE1 is not limited thereto. For example, the first connection electrode CE1 may be disposed in a layer different from that of the first sensing electrode SE1, to be connected to the first sensing electrode SE1 through a contact hole.

The first connection electrode CE1 may include a conductive material. The first connection electrode CE1 may include the same material as the first sensing electrode SE1, or include at least one material selected from the materials exemplified as the material constituting the first sensing electrode SE1. The first connection electrode CE1 may be formed in a single-layered structure or multi-layered structure. For example, the first connection electrode CE1 may have a triple-layered structure of titanium/aluminum/titanium. However, the connection electrode CE1 is not limited thereto, and the first connection electrode CE1 may be made of a material different from that of the first sensing electrode SE1.

Although a case where one first connection electrode CE1 is disposed between adjacent first sensing electrodes SE1 along the first direction DR1 is illustrated in FIGS. 5 and 6, the number of first connection electrodes CE1 may be variously modified. For example, two or more first connection electrodes CE1 may be disposed between two adjacent first sensing electrodes SE1 along the first direction DR1.

As described with reference to FIG. 1, the second electrode member IE2 may extend in the second direction DR2, and be repeatedly disposed along the first direction DR1. Although a case where three second electrode members IE2 are disposed along the first direction DR1 is illustrated as an example in FIG. 4, the second electrode members IE2 are not limited thereto, and the number of second electrode members IE2 may be variously modified.

The second electrode member IE2 may include a second sensing electrode SE2 and a second connection electrode CE2. The second sensing electrode SE2 may be repeatedly disposed along the second direction DR2, and the second connection electrode CE2 may electrically connect adjacent second sensing electrodes SE2 to each other along the second direction DR2.

In some exemplary embodiments, the second sensing electrode SE2 may include a second opening OP2. Similar to the first sensing electrode SE1, at least a central portion of each second sensing electrode SE2 may be opened, to expose a layer disposed under the second sensing electrode SE2.

Although a case where an area of the second opening OP2 is equal to that of the first opening OP1 is illustrated in FIG. 4, the second opening OP2 is not limited thereto. For example, the area of the second opening OP2 may be different from that of the first opening OP1. For example, the area of the second opening OP2 may be larger than that of the first opening OP1.

Similar to the first sensing electrode SE1, the second sensing electrode SE2 may be disposed in the first layer L1.

In an exemplary embodiment, the first sensing electrode SE1 and/or the second sensing electrode SE2 may include a side having an uneven shape (or concave-convex shape or zigzag shape). Thus, a moire pattern caused by the shape(s)

of the first sensing electrode SE1 and/or the second sensing electrode SE2 can be prevented from being viewed by a user.

The second connection electrode CE2 may electrically connect adjacent second sensing electrodes SE2 along the second direction DR2 to each other. The second connection electrode CE2 may be configured as a bridge-type connection pattern. For example, the second connection electrodes CE2 may be disposed in a second layer L2 or a third layer L3, which is different from the first layer L1 in which the second sensing electrode SE2 is disposed.

The second connection electrode CE2 may be insulated from the first connection electrode CE1 and intersect the first connection electrode CE1. Insulating layers IL1 and IL2 may be disposed between the second connection electrode CE2 and the first connection electrode CE1. As shown in FIG. 14, the second sensing electrode SE2 may be disposed on the base layer BSL, a second insulating layer IL2 may be disposed on the second sensing electrode SE2, and the second connection electrode CE2 may be disposed on the second insulating layer IL2. That is, the second insulating layer IL2 may be disposed between the second sensing electrode SE2 and the second connection electrode CE2, and the second connection electrode CE2 and the second sensing electrode SE2 may be connected to each other through a contact hole CH0 formed in the second insulating layer IL2, and be in direct contact with each other through the contact hole CH0.

The insulating layers IL1 and IL2 may include an insulating material. The insulating material may be an inorganic insulating material or an organic insulating material. For example, the inorganic insulating material may include at least one of aluminum oxide, titanium oxide, silicon oxide, silicon oxynitride, zirconium oxide, and hafnium oxide. For example, the organic insulating material may include at least one of an acryl-based resin, a methacryl-based resin, polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

The second connection electrode CE2 may include a conductive material. The second connection electrode CE2 may include the same material as the second sensing electrode SE2, or include one or more materials selected from the materials exemplified as the material constituting the second sensing electrode SE2.

When the first sensing electrode SE1 is formed to have a mesh structure, the first connection electrode CE1 and the second sensing electrode SE2 may also be formed to have a mesh structure.

Although a case where one second connection electrode CE2 is disposed between adjacent second sensing electrodes SE2 along the second direction DR2 is illustrated in FIGS. 5 and 12, the number of second connection electrodes CE2 may be variously modified.

The second sensing electrode SE2 may be a driving electrode receiving a driving signal Ts for detecting a touch position, and the first sensing electrode SE1 may be a sensing electrode outputting a sensing signal Rs for detecting a touch position. However, the second sensing electrode SE2 is not limited thereto. The second sensing electrode SE2 may be a sensing electrode and the first sensing electrode SE1 may be a driving electrode.

The first pressure electrode member PIE1 and the second pressure electrode member PIE2 may be disposed in the sensing region SA of the sensor ISL.

The first pressure electrode member PIE1 may be disposed on a row formed by the first sensing electrode SE1.

The first pressure electrode member PIE1 may include a first pressure sensing electrode PSE1, a first connection pattern PCE1, and a second connection pattern PCE2.

The first pressure sensing electrode PSE1 may be disposed in the first opening OP1 formed in the first sensing electrode SE1, and be spaced apart from the first sensing electrode SE1.

As shown in FIGS. 6, 13, and 14, the first pressure sensing electrode PSE1 may be disposed in the same first layer L1 as the first sensing electrode SE1 and the second sensing electrode SE2.

The first pressure sensing electrode PSE1 may include a conductive material. For example, the first pressure sensing electrode PSE1 may be made of the same material as the first sensing electrode SE1 and the second sensing electrode SE2.

The first pressure sensing electrode PSE1 may be formed in a curved shape to have a predetermined pattern. When a pressure having a predetermined strength is applied to the sensor ISL, the length or sectional area of the first pressure sensing electrode PSE1 may be changed. When the length or sectional area of the first pressure sensing electrode PSE1 is changed, the resistance value of the first pressure sensing electrode PSE1 may be changed, and a strength of a touch pressure may be detected based on the changed resistance value.

In some exemplary embodiments, the first pressure sensing electrode PSE1 may include first to fourth sensing cells SS1 to SS4.

As shown in FIG. 7, the first opening OP1 may include first to fourth cell regions SSA1 to SSA4 distinguished from each other by a first reference line L_REF1 and a second reference line L_REF2, and the first to fourth sensing cells SS1 to SS4 may be disposed in the first to fourth cell regions SSA1 to SSA4, respectively. The first reference line L_REF1 may extend in the first direction DR1 and pass an area center of the first pressure sensing electrode PSE1, and the second reference line L_REF2 may extend in the second direction DR2 and pass the area center of the first pressure sensing electrode PSE1.

The first and second cell regions SSA1 and SSA2 and the third and fourth cell regions SSA3 and SSA4 may be distinguished from each other by the first reference line L_REF1, and the first and fourth cell regions SSA1 and SSA4 and the second and third cell regions SSA2 and SSA3 may be distinguished from each other by the second reference line L_REF2.

The first sensing cell SS1 may be disposed in the first cell region SSA1, the second sensing cell SS2 may be disposed in the second cell region SSA2, the third sensing cell SS3 may be disposed in the third cell region SSA3, and the fourth sensing cell SS4 may be disposed in the fourth cell region SSA4. The first to fourth sensing cells SS1 to SS4 may be sequentially located along a first rotational direction RDR1 with respect to the area center of the first pressure sensing electrode PSE1.

In an exemplary embodiment, the first sensing cell SS1 may include first branch electrodes BE1 each extending in a third direction DR3, the first branch electrodes BE1 being arranged in parallel with each other. The third direction DR3 may intersect each of the first direction DR1 and the second direction DR2. When the first sensing cell SS1 includes bent portions and extending portions (i.e., portions extending relatively long as compared with the bent portions), the extending portions of the first sensing cell SS1 may be defined as the first branch electrodes BE1.

As shown in FIG. 7, sub-branch electrodes BE1-1 to BE1-10 included in the first branch electrodes BE1 may each extend in the third direction DR3 from a long side of the first cell region SSA1 to both short sides of the first cell region SSA1. The sub-branch electrodes BE1-1 to BE1-10 included in the first branch electrodes BE1 may be arranged along a fourth direction DR4, and be connected in series to each other in the first cell region SSA1. The fourth direction DR4 may intersect each of the first direction DR1 and the second direction DR2, and be substantially perpendicular to the third direction DR3.

Although a case where the first branch electrodes BE1 include ten sub-branch electrodes BE1-1 to BE1-10 is illustrated in FIG. 7, this is merely illustrative, and the first branch electrodes BE1 are not limited thereto. For example, the first branch electrodes BE1 may include two or more sub-branch electrodes.

Similar to the first sensing cell SS1, the second sensing cell SS2 may include second branch electrodes BE2 each extending in the fourth direction DR4, the second branch electrodes BE2 being arranged in parallel with each other. As shown in FIG. 7, sub-branch electrodes BE2-1 to BE2-10 included in the second branch electrodes BE2 may each extend in the fourth direction DR4 in the second cell region SSA2, and be connected in series to each other in the second cell region SSA2.

The second sensing cell SS2 may be symmetrical with the first sensing cell SS1 with respect to the second reference line L_REF2.

The second sensing cell SS2 and the first sensing cell SS1 may be connected in series between a first point P1 (or first node) and a second point P2 (or second node). The first point P1 and the second point P2 is portions exposed through a first contact hole CH1 penetrating a first insulating layer ILL and may be connected to the first connection pattern PCE1.

Similar to the first sensing cell SS1, the third sensing cell SS3 may include third branch electrodes BE3 each extending in the third direction DR3, the third branch electrodes BE3 being arranged in parallel with each other. As shown in FIG. 7, sub-branch electrodes BE3-1 to BE3-10 included in the third branch electrodes BE3 may each extend in the third direction DR3 in the third cell region SSA3, and be connected in series to each other in the third cell region SSA3.

The third sensing cell SS3 may be symmetrical with the second sensing cell SS2 with reference to the first reference line L_REF1.

Similar to the second sensing cell SS2, the fourth sensing cell SS4 may include fourth branch electrodes BE4 each extending in the fourth direction DR4, the fourth branch electrodes BE4 being arranged in parallel with each other. As shown in FIG. 7, sub-branch electrodes BE4-1 to BE4-10 included in the fourth branch electrodes BE4 may each extend in the fourth direction DR4 in the fourth cell region SSA4, and be connected in series to each other in the fourth cell region SSA4.

The fourth sensing cell SS4 may be symmetrical with the third sensing cell SS3 with respect to the second reference line L_REF2, and be symmetrical with the first sensing cell SS1 with respect to the first reference line L_REF1.

That is, the first to fourth sensing cells SS1 to SS4 may have shapes symmetrical with each other, i.e., shapes different from each other. Thus, a phenomenon in which the first pressure sensing electrode PSE1 (and the second pressure sensing electrode PSE2) is viewed in a specific viewing direction (and a phenomenon in which image quality is reduced due to the phenomenon) can be prevented. Further, the recognition accuracy of a touch pressure can be improved.

When the first pressure sensing electrode (or the first to fourth sensing cells SS1 to SS4) includes branch electrodes extending in the same specific direction (e.g., the third direction DR3), an image displayed on the display panel may be distorted in a specific direction by the branches. When a user views the display panel in a specific direction, the first pressure sensing electrode PSE1 may be viewed. In addition, the branch electrodes extending in a specific direction may be easily deformed with respect to a pressure in a perpendicular direction perpendicular to the specific direction, and accordingly, the accuracy of a touch pressure may be changed depending on a direction in which the pressure is applied.

The first pressure sensing electrode PSE1 includes the first to fourth sensing cells SS1 to SS4, and the first to fourth sensing cells SS1 to SS4 include the branch electrodes extending in different directions. Thus, the phenomenon in which the first pressure sensing electrode PSE1 is viewed can be prevented, and a touch pressure can be accurately sensed regardless of the direction in which a pressure is applied.

The fourth sensing cell SS4 and the third sensing cell SS3 may be connected in series between a third point P3 (or third node) and a fourth point P4 (or fourth node). Similar to the first point P1 and the second point P2, the third point P3 and the fourth point P4 are portions exposed through a second contact hole CH2 penetrating the first insulating layer ILL and be connected to the second connection pattern PCE2.

In an exemplary embodiment, the third sensing cell SS3 and the fourth sensing cell SS4 may be connected to the first sensing cell SS1 and the second sensing cell SS2. For example, the first to fourth sensing cells SS1 to SS4 may be sequentially connected in series.

As shown in FIG. 4, the second connection pattern PCE2 (i.e., the second connection pattern PCE2 connected to the third sensing cell SS3 and the fourth sensing cell SS4) may be connected to the first connection pattern PCE1 (i.e., the first connection pattern PCE1 connected to the first sensing cell SS1 and the second sensing cell SS2) through a fifth connection pattern PCE5 at an edge of the sensing region SA (or in the peripheral region NSA). Therefore, the third sensing cell SS3 may be connected to the second sensing cell SS2 through the first connection pattern PCE1, the fifth connection pattern PCE5, and the second connection pattern PCE2, and through an adjacent pressure sensing electrode.

However, the third sensing cell SS3 is not limited thereto, and the third sensing cell SS3 and the fourth sensing cell SS4 may be connected to the first sensing cell SS1 and the second sensing cell SS2 in the first sensing cell SS1 (or the first cell region SSA1), and the connection order of the first to fourth sensing cells SS1 to SS4 may be changed. This will be described later with reference to FIG. 26.

Although a case where the first branch electrodes BE1 of the first sensing cell SS1 extend in the third direction DR3 from a long side of the first cell region SSA1 to both short sides of the first cell region SSA1 is illustrated in FIG. 7, the first sensing cell SS1 is not limited thereto.

For example, as shown in FIG. 8, the first sensing cell SS1 may include first branch electrodes BE1' each extending in the fourth direction DR4, the first branch electrodes BE1' being arranged in parallel with each other.

Sub-branch electrodes BE1-1' to BE1-6' included in the first branch electrodes BE1' may each extend in the fourth direction DR4 from one short side of the first cell region SSA1 to the other short side in the first cell region SSA1. The sub-branch electrodes BE1-1' to BE1-6' included in the first branch electrodes BE1' may be arranged along the third direction DR3, and may be connected in series to each other in the first cell region SSA1.

Although a case where the first branch electrodes BE1' include six sub-branch electrodes BE1-1' to BE1-6' is illustrated in FIG. 8, this is merely illustrative, and the first branch electrodes BE1' are not limited thereto.

Similar to the first sensing cell SS1, the second sensing cell SS2 may include second branch electrodes BE2' each extending in the third direction DR3, the second branch electrodes BE2' being arranged in parallel with each other. Sub-branch electrodes BE2-1' to BE2-6' included in the second branch electrodes BE2' may be arranged along the fourth direction DR4 in the second cell region SSA2, and be connected in series to each other in the second cell region SSA2. The second sensing cell SS2 may be symmetrical with the first sensing cell SS1 with respect to the second reference line L_REF2.

Similar to the first sensing cell SS1, the third sensing cell SS3 may include third branch electrodes BE3' each extending in the fourth direction DR4, the third branch electrodes BE3' being arranged in parallel with each other. Sub-branch electrodes BE3-1' to BE3-6' included in the third branch electrodes BE3' may be arranged along the third direction DR3 in the third cell region SSA3, and be connected in series to each other in the third cell region SSA3. The third sensing cell SS3 may be symmetrical with the second sensing cell SS2 with respect to the first reference line L_REF1.

Similar to the second sensing cell SS2, the fourth sensing cell SS4 may include fourth branch electrodes BE4' each extending in the third direction DR3, the fourth branch electrodes BE4' being arranged in parallel with each other. Sub-branch electrodes BE4-1' to BE4-6' included in the fourth branch electrodes BE4' may be arranged along the fourth direction DR4 in the fourth cell region SSA4, and be connected in series to each other in the fourth cell region SSA4. The fourth sensing cell SS4 may be symmetrical with the third sensing cell SS3 with respect to the second reference line L_REF2, and be symmetrical with the first sensing cell SS1 with respect to the first reference line L_REF1.

In another example, as shown in FIG. 9, the first sensing cell SS1 may include first branch electrodes BE1" each extending in the second direction DR2, the first branch electrodes BE1" being arranged in parallel with each other.

Sub-branch electrodes BE1-1" to BE1-9" included in the first branch electrodes BE1" may each extend in the second direction DR2 from a long side of the first cell region SSA1 to a short side of the first cell region SSA1 in the first cell region SSA1. The sub-branch electrodes BE1-1" to BE1-9" included in the first branch electrodes BE1" may be arranged along the second direction DR2, and be connected in series to each other in the first cell region SSA1.

Similar to the first sensing cell SS1, the second sensing cell SS2 may include second branch electrodes BE2" each extending in the first direction DR1, the second branch electrodes BE2" being arranged in parallel with each other. Sub-branch electrodes BE2-1" to BE2-9" included in the second branch electrodes BE2" may be arranged along the second direction DR2 in the second cell region SSA2, and be connected in series to each other in the second cell region SSA2. The second sensing cell SS2 may have a shape in which the first sensing cell SS1 is rotated by 90 degrees with respect to the area center of the first pressure sensing electrode PSE1. That is, the second sensing cell SS2 may be rotationally symmetrical with the first sensing cell SS1 with respect to the area center of the first pressure sensing electrode PSE1.

Similar to the first sensing cell SS1, the third sensing cell SS3 may include third branch electrodes BE3" each extending in the second direction DR2, the third branch electrodes BE3" being arranged in parallel with each other. Sub-branch electrodes BE3-1" to BE3-9" included in the third branch electrodes BE3" may be arranged along the first direction DR1 in the third cell region SSA3, and be connected in series to each other in the third cell region SSA3. The third sensing cell SS3 may be rotationally symmetrical with the second sensing cell SS2 with respect to the area center of the first pressure sensing electrode PSE1.

Similar to the second sensing cell SS2, the fourth sensing cell SS4 may include fourth branch electrodes BE4" each extending in the first direction DR1, the fourth branch electrodes BE4" being arranged in parallel with each other. Sub-branch electrodes BE4-1" to BE4-9" included in the fourth branch electrodes BE4" may be arranged along the second direction DR2 in the fourth cell region SSA4, and be connected in series to each other in the fourth cell region SSA4. The fourth sensing cell SS4 may be rotationally symmetrical with the third sensing cell SS3 with respect to the area center of the first pressure sensing electrode PSE1. That is, the first to fourth sensing cells SS1 to SS4 may be rotationally symmetrical with each other with respect to the area center of the first pressure sensing electrode PSE1.

Although a case where the first to fourth branch electrodes BE1" to BE4" have a straight-line shape is illustrated in FIG. 9, the first to fourth branch electrodes BE1" to BE4" are not limited thereto.

For example, when the first sensing electrode SE1 and the second sensing electrode SE2 are formed to have mesh structures, the first pressure sensing electrode PSE1 may be formed by removing a partial region of the mesh structure, and each of the first to fourth branch electrodes BE1" to BE4" may include a bent portion.

As shown in FIG. 10, each of seventh to ninth sub-branch electrodes BE1-7" to BE1-9" of the first branch electrodes BE1" may extend entirely in the second direction DR2 while alternately extending in the third direction DR3 and the fourth direction DR4.

Since the first pressure sensing electrode PSE1 is formed by removing the partial region of the mesh structure, a branch part BR connected to the first pressure sensing electrode PSE1 may be formed in the first opening OP1.

The branch part BR may be a residue remaining by removing the partial region of the mesh structure. The branch part BR may be disposed in the same layer as the first pressure sensing electrode PSE1, and be made of the same material as the first pressure sensing electrode PSE1.

Referring back to FIG. 5, the first connection pattern PCE1 and the second connection pattern PCE2 may electrically connect adjacent first pressure sensing electrodes PSE1 to each other along the first direction DR1, and be in direct contact with the first pressure sensing electrode PSE1. For example, the first connection pattern PCE1 may connect the second sensing cell SS2 to the first sensing cell SS1 of an adjacent first pressure sensing electrode PSE1, and the second connection pattern PCE2 may connect the third sensing cell SS3 to the fourth sensing cell SS4 of an adjacent first pressure sensing electrode PSE1. Each of the first connection pattern PCE1 and the second connection pattern PCE2 is not in contact with the first electrode member IE1 and the second electrode member IE2, but may instead be spaced apart from the first electrode member IE1 and the second electrode member IE2.

As shown in FIGS. 11 and 13, the first insulating layer IL1 may be disposed between the first pressure sensing electrode PSE1 and the first connection pattern PCE1 (and/or the second connection pattern PCE2), and the first pressure sensing electrode PSE1 and the first connection pattern PCE1 may be in contact with each other through the first contact hole CH1 formed in the first insulating layer IL1. Similarly, the first input sensing electrode PSE1 and the second connection pattern PCE2 may be in contact with each other through the second contact hole CH2 formed in the first insulating layer IL1.

The second input electrode member PIE2 may be disposed on a column formed by the second sensing electrode SE2. The second pressure electrode member PIE2 may include a second pressure sensing electrode PSE2, a third connection pattern PCE3, and a fourth connection pattern PCE4.

The second pressure sensing electrode PSE2 may be disposed in the second opening OP2 formed in the second sensing electrode SE2, and be spaced apart from the second sensing electrode SE2.

Similar to the first pressure sensing electrode PSE1, the second pressure sensing electrode PSE2 may be formed in a curved shape to have a predetermined pattern, as shown in FIGS. 5 and 6. When a pressure having a predetermined strength is applied to the sensor ISL, the length or sectional area of the second pressure sensing electrode PSE2 may be changed. When the length or sectional area of the second pressure sensing electrode PSE2 is changed, the resistance value of the second pressure sensing electrode PSE2 may be changed, and a strength of a touch pressure may be detected based on the changed resistance value.

The shape of the second pressure sensing electrode PSE2 is similar to that of the first pressure sensing electrode PSE1 described with reference to FIGS. 7 to 10, and therefore, overlapping descriptions will not be repeated.

The second pressure electrode PSE2 may be disposed in the same first layer L1 as the first sensing electrode SE1 and the second sensing electrode SE2. The second pressure sensing electrode PSE2 may include a conductive material. For example, the second pressure sensing electrode PSE2 may be made of the same material as the first sensing electrode SE1 and the second sensing electrode SE2.

The third connection pattern PCE3 and the fourth connection pattern PCE4 may electrically connect adjacent second pressure sensing electrodes PSE2 along the second direction DR2 to each other. Each of the third connection pattern PCE3 and the fourth connection pattern PCE4 is not in contact with the first electrode member IE1 and the second electrode member IE2 but may instead be spaced apart from the first electrode member IE1 and the second electrode member IE2.

As shown in FIGS. 12 and 15, the second insulating layer IL2 may be disposed between the second pressure sensing electrode PSE2 and the third connection pattern PCE3 (and/or the fourth connection pattern PCE4), and the second pressure sensing electrode PSE2 and the third connection pattern PCE3 may be in contact with each other through a third contact hole CH3 formed in the second insulating layer IL2. Similarly, the fourth connection pattern PCE4 and the third connection pattern PCE3 may be in contact with each other through a fourth contact hole CH4 formed in the second insulating layer IL2.

Referring back to FIG. 4, sensing lines SL1 and SL2 and pressure sensing lines PSL1 to PSL4 may be disposed on the peripheral region NSA of the base layer BSL.

The sensing lines SL1 and SL2 may include a first sensing line SL1 connected to the first electrode member IE1 and a second sensing line SL2 connected to the second electrode member IE2.

For example, the first sensing line SL1 and the second sensing line SL2 may be respectively connected to one ends of the first electrode member IE1 and the second electrode member IE2, and any separate sensing line may not be connected to the other end of each of the first electrode member IE1 and the second electrode member IE2. That is, each of the lines connected to the first electrode member IE1 and the second electrode member IE2 may be formed in a single routing structure, but the lines are not limited thereto.

For example, although not shown in the drawing, the second sensing line SL2 may be further connected to the other end of the second electrode member IE2. That is, the line connected to the second electrode member IE2 may be formed in a double routing structure. Thus, an RC delay occurring due to resistance of the second electrode member IE2, etc. can be minimized. In another example, an additional sensing line may be connected to the other end of the first electrode member IE1 or the other end of each of the first electrode member IE1 and the second electrode member IE2.

The pressure sensing lines PSL1 to PSL4 may include a first pressure sensing line PSL1 and a second pressure sensing line PSL2, which are connected to one end of the first pressure electrode member PIE1, and a third input sensing line PSL3 and a fourth input sensing line PSL4, which are connected to one end of the second pressure electrode member PIE2.

Pad parts TP1 and TP2 may be located on the peripheral region NSA of the base layer BSL. The pad parts TP1 and TP2 may be connected to the sensing lines SL1 and SL2 and the pressure sensing lines PSL1 to PSL4. In addition, the input sensing controller IS-C may be electrically connected to the pad parts TP1 and TP2.

The pad parts TP1 and TP2 may include a first pad part TP1 and a second pad part TP2, which are spaced apart from each other along the first direction DR1. For example, the first pad part TP1 may be connected to the first pressure sensing line PSL1 and the second pressure sensing line PSL2, and the second pad part TP2 may be connected to the first sensing line SL1, the second sensing line SL2, the third pressure sensing line PSL3, and the fourth pressure sensing line PSL4.

As described with reference to FIGS. 4 to 15, the first sensing electrode SE1, the second sensing electrode SE2, the first pressure sensing electrode PSE1, and the second input sensing electrode PSE2 are disposed in the same first layer L1, and accordingly, a manufacturing process of the input sensing device ISU (and the display device) can be simplified. Further, the input sensing device ISU can be implemented in a thin type while having a function of pressure sensing.

In addition, each of the first pressure sensing electrode PSE1 (and the second pressure sensing electrode PSE2 includes the first to fourth sensing cells SS1 to SS4, and the first fourth sensing cells SS1 to SS4 include the branch electrodes extending in different directions. Thus, a phenomenon in which the first pressure sensing electrode PSE1 (and the second pressure sensing electrode PSE2) is viewed (and a phenomenon in which image quality is reduced due to the phenomenon) can be prevented, and the recognition accuracy of a touch pressure can be improved.

Figure 16:
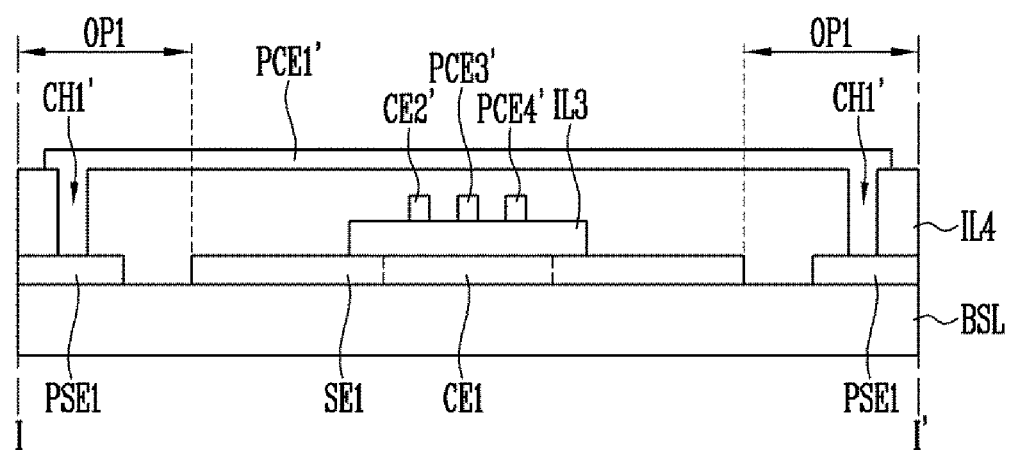
FIG. 16 is a sectional view illustrating another example of the sensor taken along line I-I' shown in FIG. 5.
Figure 17:
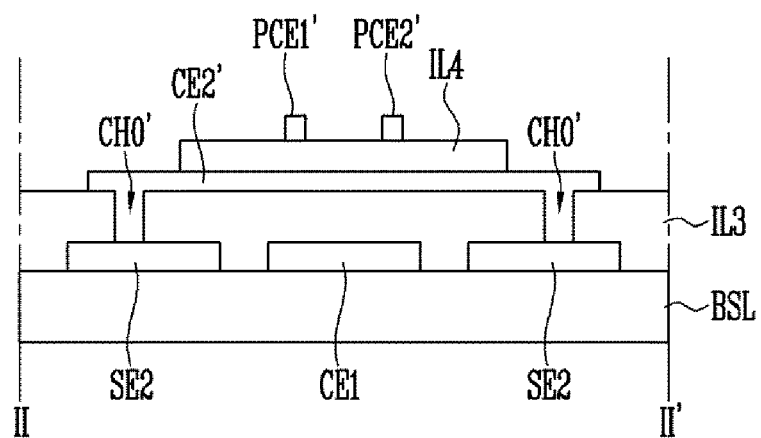
FIG. 17 is a sectional view illustrating another example of the sensor taken along line II-IF shown in FIG. 5.
Figure 18:
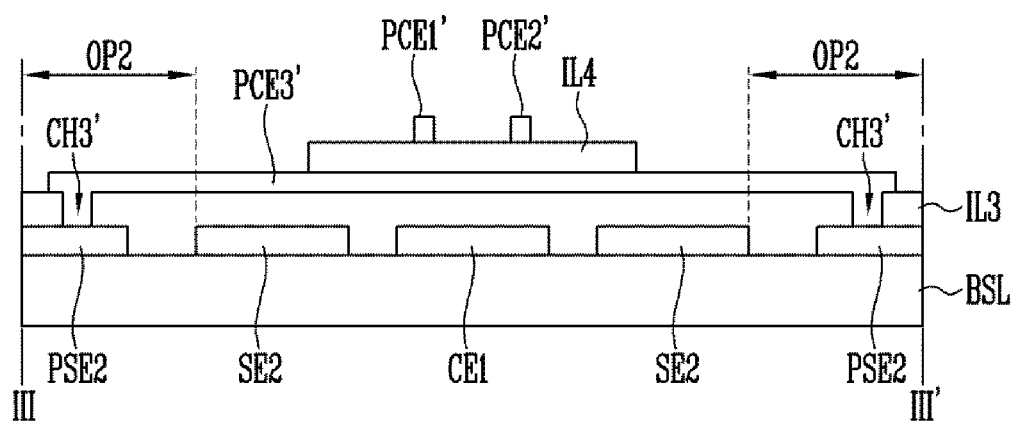
FIG. 18 is a sectional view illustrating another example of the sensor taken along line shown in FIG. 5.

FIG. 16 is a sectional view illustrating another example of the sensor taken along line I-I' shown in FIG. 5. FIG. 17 is a sectional view illustrating another example of the sensor taken along line II-IF shown in FIG. 5. FIG. 18 is a sectional view illustrating another example of the sensor taken along line shown in FIG. 5.

Referring to FIGS. 13 to 18, the sensor shown in FIGS. 16 to 18 may be substantially similar to the sensor shown in FIGS. 13 to 15, except stacked positions of a second connection electrode CE2' and first to fourth connection patterns PCE1', PCE2', PCE3', and PCE4'. Therefore, overlapping descriptions will not be repeated.

The sensor may include a base layer BSL and a sensing pattern disposed on the base layer BSL. The sensing pattern may include a first electrode member IE1, a second electrode member IE2, a first input electrode member PIE1, and a second input electrode member PIE2.

A first conductive layer (or a first electrode layer) may be disposed on the base layer BSL. The first electrode layer may include a first sensing electrode SE1, a first connection electrode CE1, a second sensing electrode SE2, a first pressure sensing electrode PSE1, and a second pressure sensing electrode PSE2.

A third insulating layer IL3 may be disposed on the first conductive layer, and a second conductive layer may be disposed on the third insulating layer IL3. The second conductive layer may include the second connection electrode CE2', the third connection pattern PCE3', and the fourth connection pattern PCE4'.

The third insulating layer IL3 may be disposed between the first conductive layer and the second conductive layer to insulate the first conductive layer and the second conductive layer from each other. As shown in FIGS. 17 and 18, the third insulating layer IL3 may include a contact hole CH0' and a third contact hole CH3'.

The second connection electrode CE2' may be electrically connected to the second sensing electrode SE2 through the contact hole CH0'. The third connection pattern PCE3' may be connected to the second pressure sensing electrode PSE2 through the third contact hole CH3'.

In addition, the second connection electrode CE2', the third connection pattern PCE3', and the fourth connection pattern PCE4' may be disposed between the third insulating layer IL3 and a fourth insulating layer IL4.

The fourth insulating layer IL4 may be disposed on the second conductive layer, and a third conductive layer may be disposed on the fourth insulating layer IL4. The third conductive layer may include the first connection pattern PCE1' and the second connection pattern PCE2'.

The fourth insulating layer IL4 may be disposed between the second conductive layer and the third conductive layer to insulating the second conductive layer and the third conductive layer from each other. The fourth insulating layer IL4 may include a first contact hole CH1'.

The first connection pattern PCE1' may be electrically connected to the first pressure sensing electrode PSE1 (or the first and second cells SS1 and SS2 and the first and second points P1 and P2, which are described with reference to FIG. 7) through the first contact hole CH1'. Although not shown in the drawings, the second connection pattern PCE2' may be connected to the first pressure sensing electrode PSE1 (or the third and fourth sensing cells SS3 and SS4 and the first and second points P1 and P2, which are described with reference to FIG. 7) through a second contact hole penetrating the fourth insulating layer IL4.

As described with reference to FIGS. 16 to 18, the second connection electrode CE2' (and third and fourth connection patterns PCE3' and PCE4') may be disposed on the first connection electrode CE1, and the first and second connection patterns PCE1' and PCE2' may be disposed on the second connection electrode CE2'.

Figure 19:
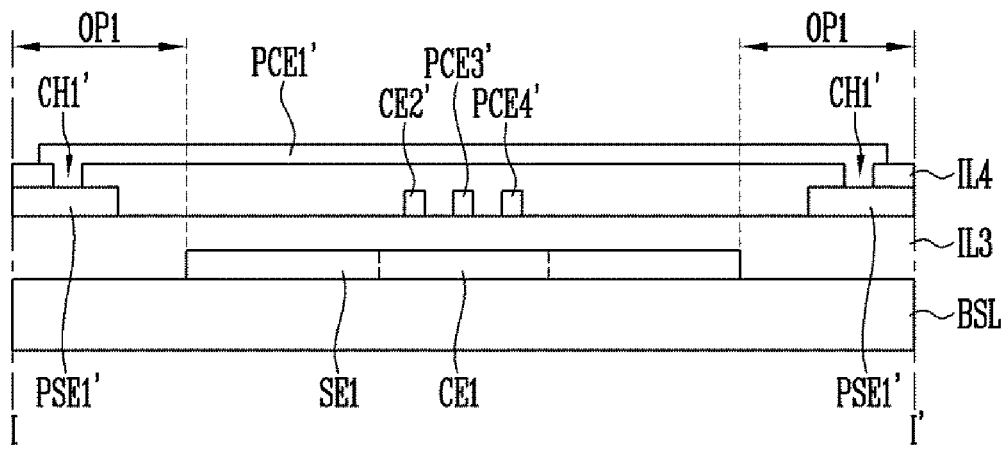
FIG. 19 is a sectional view illustrating still another example of the sensor taken along line I-I' shown in FIG. 5.
Figure 20:
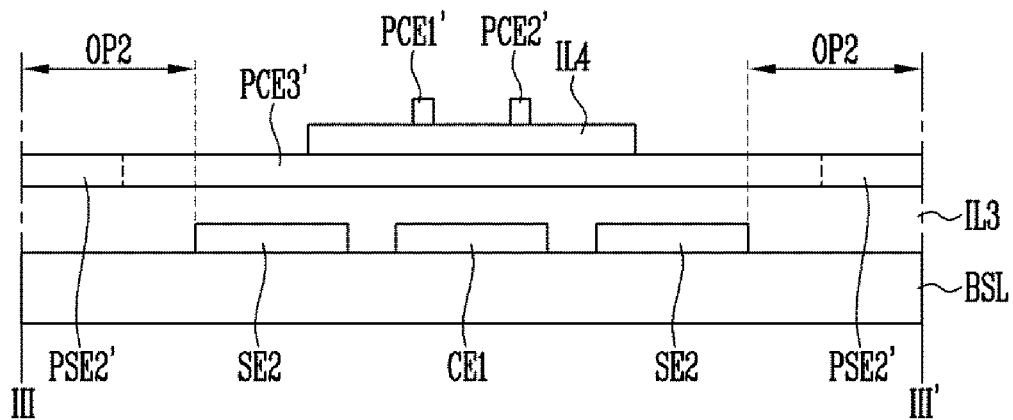
FIG. 20 is a sectional view illustrating still another example of the sensor taken along line shown in FIG. 5.

FIG. 19 is a sectional view illustrating still another example of the sensor taken along line I-I' shown in FIG. 5. FIG. 20 is a sectional view illustrating still another example of the sensor taken along line shown in FIG. 5.

Referring to FIGS. 16 to 20, the sensor shown in FIGS. 19 and 20 may be substantially similar to the sensor shown in FIGS. 16 to 18, except stacked positions of a first pressure sensing electrode PSE1' and a second pressure sensing electrode PSE2'. Therefore, overlapping descriptions will not be repeated.

The sensor may include a base layer BSL and a sensing pattern disposed on the base layer BSL. The sensing pattern may include a first electrode member IE1, a second electrode member IE2, a first pressure electrode member PIE1, and a second pressure electrode member PIE2.

A first conductive layer (or first electrode layer) may be disposed on the base layer BSL. The first electrode layer may include a first sensing electrode SE1, a first connection electrode CE1, and a second sensing electrode SE2.

A third insulating layer IL3 may be disposed on the first conductive layer, and a second conductive layer may be disposed on the third insulating layer IL3. The third insulating layer IL3 may be entirely disposed on the first conductive layer. The second conductive layer may include a second connection electrode CE2', the first pressure sensing electrode PSE1', and the pressure sensing electrode PSE2', a third connection pattern PCE3', and a fourth connection pattern PCE4'. The second pressure sensing electrode PSE2', the third connection pattern PCE3', and the fourth connection pattern PCE4' may be integrally formed.

A fourth insulating layer IL4 may be disposed on the second conductive layer, and a third conductive layer may be disposed on the fourth insulating layer IL4. The third conductive layer may include a first connection pattern PCE1' and a second connection pattern PCE2'. As shown in FIG. 19, the first connection pattern PCE1' may be electrically connected to the first pressure sensing electrode PSE1' (or the first and second sensing cells SS1 and SS2 and first and second points P1 and P2, which are described with reference to FIG. 7) through a first contact hole CH1'. Although not shown in the drawing, the second connection pattern PCE2' may be connected to the first pressure sensing electrode PSE1' (or the third and fourth sensing cells SS3 and SS4 and the first and second points P1 and P2, which are described with reference to FIG. 7) through a second contact hole penetrating the fourth insulating layer IL4.

As described with reference to FIGS. 19 and 20, the first pressure sensing electrode PSE1' and the second pressure sensing electrode PSE2' may be disposed in the same layer as the second connection electrode CE2 of the sensor.

Figure 21:
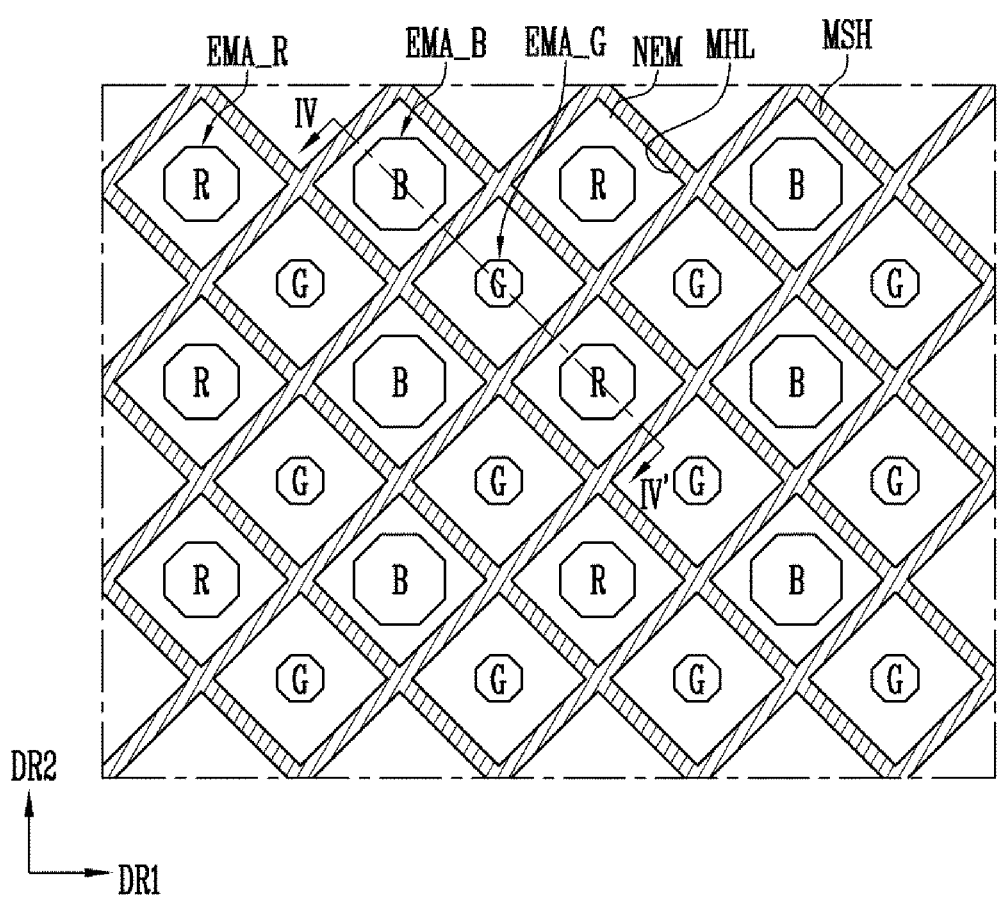
FIG. 21 is a view illustrating an example of a first sensing electrode included in the input sensing device shown in FIG. 4.
Figure 22:
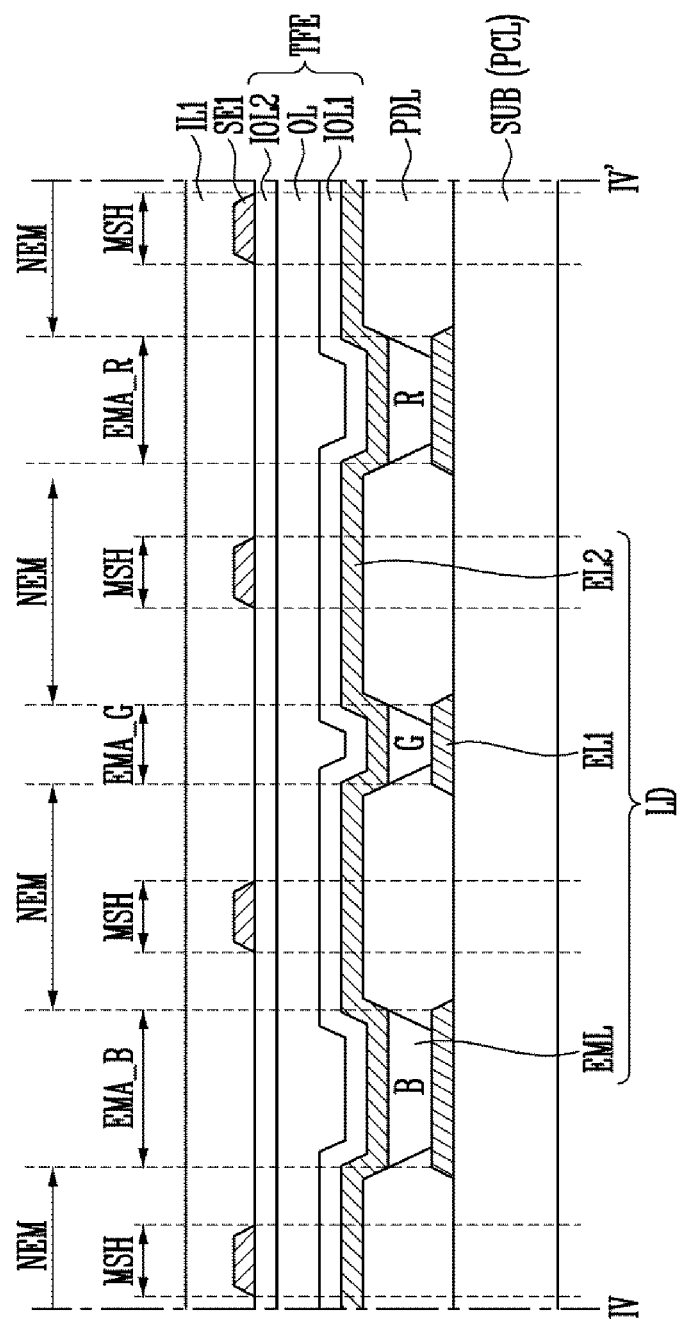
FIG. 22 is a sectional view illustrating an example of the first sensing electrode and a pixel, which are taken along line IV-IV' shown in FIG. 21.

FIG. 21 is a view illustrating an example of the first sensing electrode included in the input sensing device shown in FIG. 4. An arrangement relationship between the first sensing electrode SE1 (and/or the first pressure sensing electrode PSE1) having a mesh structure and the pixel of the display panel is illustrated in FIG. 21. FIG. 22 is a sectional view illustrating an example of the first sensing electrode and the pixel, which are taken along line IV-IV' shown in FIG. 21. A pixel is illustrated in FIG. 22, based on a light emitting element LD and an upper structure thereof.

Referring to FIG. 21, the display panel may include pixels R, G, and B. Each of the pixels R, G, and B may include an emission region EMA. A non-emission region NEM may be disposed between the emission regions EMA of the respective pixels. A mesh-type pattern MSH may be disposed in the non-emission region NEM.

The pixels R, G, and B may include a first color pixel R, a second color pixel B, and a third color pixel G. The color pixels may be arranged in various manners.

In an exemplary embodiment, the first color pixel R (e.g., a red pixel) and the second color pixel B (e.g., a blue pixel) may be alternately arranged along the first direction DR1 on a first row, and the third color pixel G (e.g., a green pixel) may be repeatedly arranged along the first direction DR1 on a second row adjacent to the first row. The pixel belonging to the second row may be disposed to cross the pixel belonging to the first row in the first direction DR1.

Sizes of the emission regions EMA in the respective color pixels may be different from each other. For example, an emission region EMA_B of the second color pixel B may be larger than that EMA_R of the first color pixel R, and an emission region EMA_G of the third color pixel G may be smaller than that EMA_R of the first color pixel R.

The shape of the emission region EMA of each color pixel may be approximately an octagonal shape. However, the emission region EMA is not limited thereto, and the shape of each emission region EMA may be a circular shape, a rhombus shape, any other polygonal shape, a polygonal shape having rounded corners, etc.

The mesh-type pattern MSH may be disposed along boundaries of the pixels in the non-emission region NEM. The mesh-type pattern MSH may not overlap with the emission region EMA. A width of the mesh-type pattern MSH may be less than that of the non-emission region NEM. In an exemplary embodiment, a mesh hole MHL exposed by the mesh-type pattern MSH may substantially have a rhombus shape. Mesh holes MHL may be have the same size. However, the sizes of the mesh holes may be different from each other depending on sizes of emission regions EMA exposed by the mesh holes, or be different from each other regardless of the sizes of the emission regions EMA. Although a case where a case where one mesh hole MHL corresponds to one emission region EMA is illustrated as an example in the drawing, the mesh hole MHL is not limited thereto, and one mesh hole MHL may correspond to two or more emission regions EMA.

Referring to FIG. 22, a first electrode EL1 may be disposed for each pixel on the base substrate SUB (and the pixel circuit layer PCL). A pixel defining layer PDL exposing the first electrode EL1 may be disposed over the first electrode EL1. The pixel defining layer PDL may be disposed in the non-emission region NEM.

An emitting layer EML may be disposed on the first electrode EL1 exposed by the pixel defining layer PDL, and a second electrode EL2 may be disposed on the emitting layer EML. The second electrode EL2 may be entirely disposed on the emitting layer EML without distinguishing pixels from each other. The first electrode EL1, the emitting layer EML, and the second electrode EL2 may constitute a light emitting element LD.

A thin film encapsulation TFE including a first inorganic layer IOL1, an organic layer OL, and a second inorganic layer IOL2 may be disposed on the top of the second electrode EL2, and a first sensing electrode SE1, and a first insulating layer IL1 may be sequentially disposed on the thin film encapsulation.

The first sensing electrode SE1 may be disposed to overlap with the pixel defining layer PDL, and be disposed in the non-emission region NEM. The first sensing electrode SE1 constitutes the mesh-type pattern MSH of the sensor, and does not overlap with the emission region EMA. Hence, the first sensing electrode SE1 does not interfere with light emission and is not viewed by a user.

Figure 23:
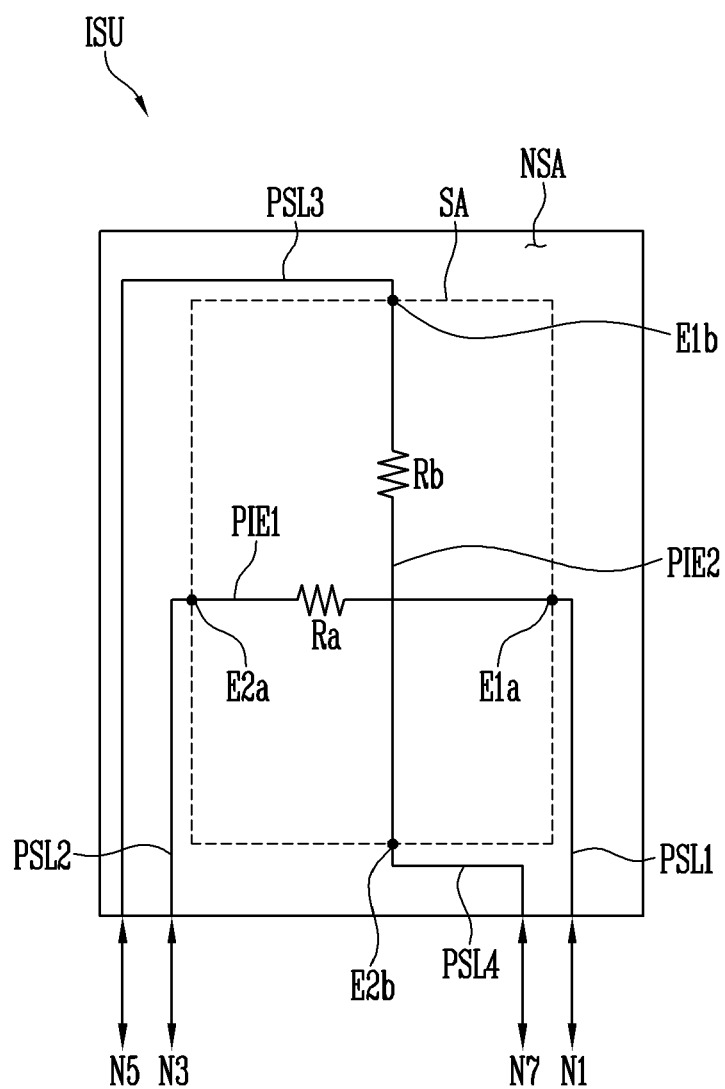
FIG. 23 is a plan view schematically illustrating an arrangement of a first pressure electrode member, a second pressure electrode member, and signal lines of a touch sensor and a connection relationship of the first pressure electrode member, the second pressure electrode member, and the signal lines with a Wheatstone bridge circuit according to an exemplary embodiment of the present invention.
Figure 24:
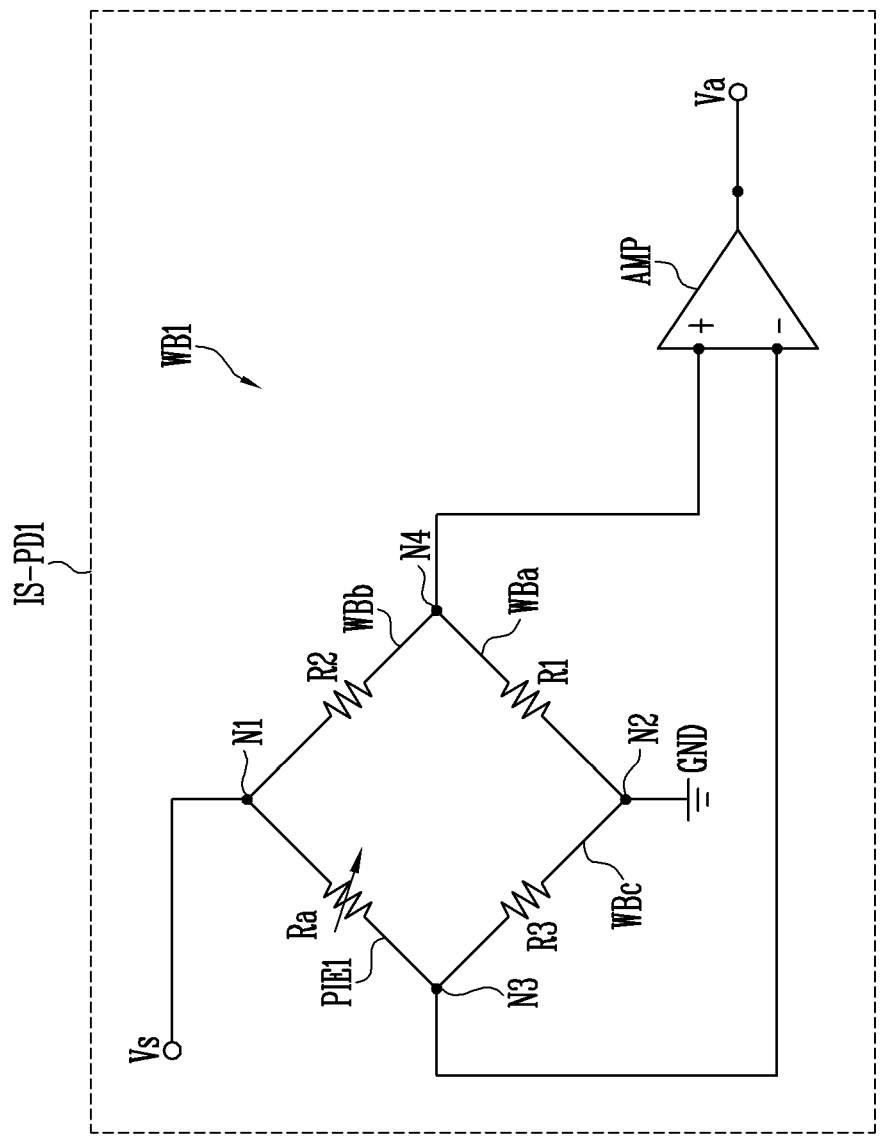
FIG. 24 is a view schematically illustrating a first pressure detector including a first Wheatstone bridge circuit electrically connected to the first pressure electrode member of the touch sensor according to an exemplary embodiment of the present invention.
Figure 25:
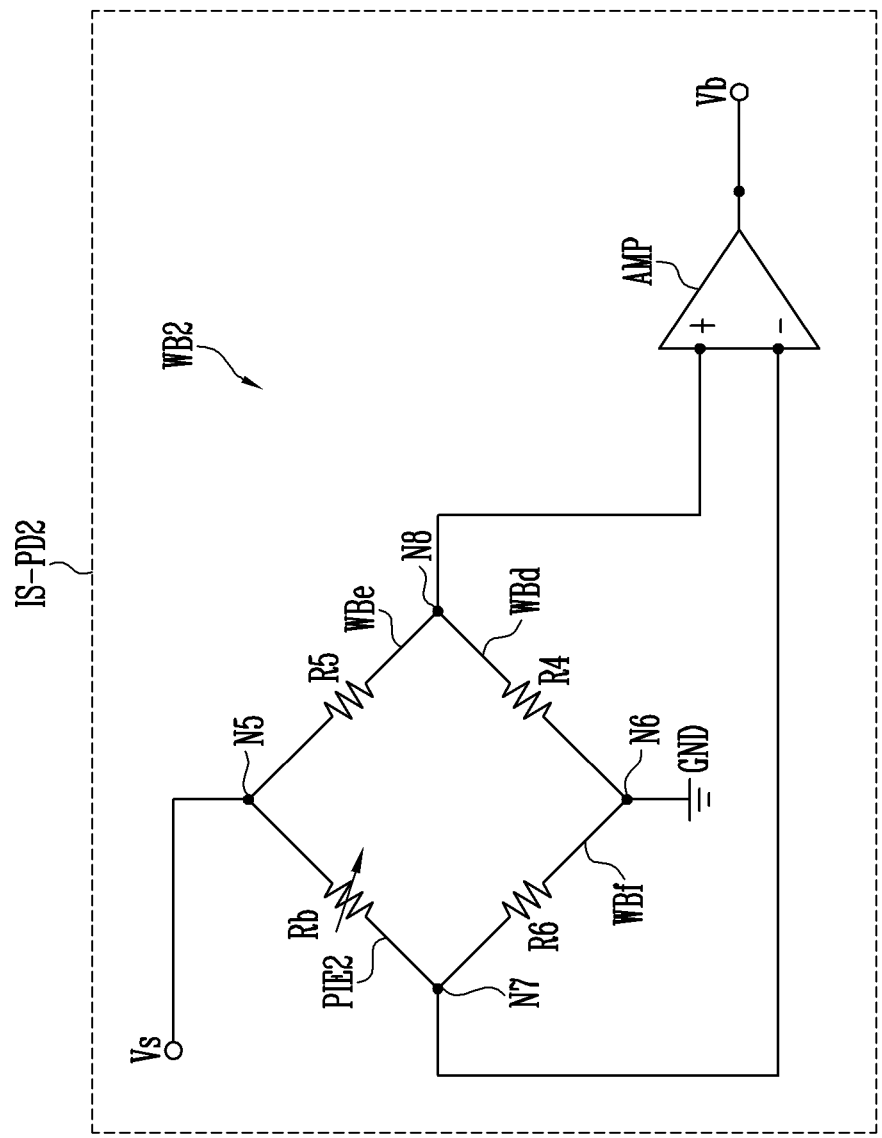
FIG. 25 is a view schematically illustrating a second pressure detector including a second Wheatstone bridge circuit electrically connected to the second pressure electrode member of the touch sensor according to an embodiment of the present invention.

FIG. 23 is a plan view schematically illustrating an arrangement of the first pressure electrode member, the second pressure electrode member, and signal lines of the touch sensor and a connection relationship of the first pressure electrode member, the second pressure electrode member, and the signal lines with a Wheatstone bridge circuit according to an exemplary embodiment of the present invention. FIG. 24 is a view schematically illustrating a first pressure detector including a first Wheatstone bridge circuit electrically connected to the first pressure electrode member of the touch sensor according to an exemplary embodiment of the present invention. FIG. 25 is a view schematically illustrating a second pressure detector including a second Wheatstone bridge circuit electrically connected to the second pressure electrode member of the touch sensor according to an exemplary embodiment of the present invention.

Referring to FIGS. 23 to 25, the first pressure electrode member PIE1 may include one end E1a and the other end E2a, which are located at sides opposite to each other along the first direction DR1. The one end E1a of the first pressure electrode member PIE1 may be connected to the first pressure sensing line PSL1, and the other end E2a of the first pressure sensing member PIE1 may be connected to the second pressure sensing line PSL2. The second pressure electrode member PIE2 may include one end E1b and the other end E2b, which are located at sides opposite to each other along the second direction DR2. The one end E1b of the second pressure electrode member PIE2 may be connected to the third pressure sensing line PSL3, and the other end E2b of the second pressure electrode member PIE2 may be connected to the pressure sensing line PSL4.

For convenience of description, one first pressure electrode member PIE1 and one second pressure electrode member PIE2 are exemplarily illustrated in FIG. 23, but a plurality of first pressure electrode members PIE1 and a plurality of second pressure electrode members PIE2 may be disposed on the sensing region SA. That is, first Wheatstone bridge circuits WB1 and second Wheatstone bridge circuits WB2, of which number corresponds to that of the plurality of first pressure electrode members PIE1 and the plurality of second pressure electrode members PIE2, may be individually connected electrically to the respective first and second pressure electrode members PIE1 and PIE2, to be provided to the input sensing controller IS-C.

Referring to FIG. 24, the first input detector IS-PD1 may include a first Wheatstone bridge circuit WB1. The first pressure detector IS-PD1 may further include an analog-digital converter and a processor, which detect a first voltage Va output from the first Wheatstone bridge circuit WB1.

The first Wheatstone bridge circuit WB1 may include a first node N1, a second node N2, a first output node N3, and a second output node N4. A driving voltage Vs may be provided to the first node N1, and the second node N2 may be connected to a ground GND.

The first Wheatstone bridge circuit WB1 may further include a first resistor WBa connected to the second node N2 and the second output node N4, a second resistor WBb connected to the first node N1 and the second output node N4, and a third resistor WBc connected to the second node N2 and the first output node N3.

Each of a resistance value R1 of the first resistor WBa, a resistance value R2 of the second resistor WBb, and a resistance value R3 of the third resistor WBc may have a predetermined value. That is, the first resistor WBa to the third resistor WBc may be fixed resistors.

The first Wheatstone bridge circuit WB1 may further include an amplifying circuit AMP. The amplifying circuit AMP may be implemented as an amplifier, and include an inverting input terminal, a non-inverting input terminal, and an output terminal. An electrical flow between the first output node N3 and the second output node N4 may be sensed through the amplifying circuit AMP. That is, the amplifying circuit AMP may operate as a current detection device or voltage measurement device.

Any one of the first output node N3 and the second output node N4 may be electrically connected to any one of the input terminals of the amplifying circuit AMP, and the other of the first output node N3 and the second output node N4 may be electrically connected to the other one of the input terminals of the amplifying circuit AMP. For example, the first output node N3 may be connected to the inverting input terminal of the amplifying circuit AMP, and the second output node N4 may be connected to the non-inverting input terminal of the amplifying circuit AMP.

The output terminal of the amplifying circuit AMP may output the first voltage Va in proportion to a difference between voltage values input to both the input terminals.

The one end E1a of the first pressure electrode member PIE1 may be electrically connected to the first node N1 through the first pressure sensing line PSL1, and the other end E2a of the first pressure electrode member PIE1 may be connected to the first output node N3 through the second pressure sensing line PSL2.

The first pressure electrode member PIE1, the first resistor WBa, the second resistor WBb, and the third resistor WBc may be connected to each other, to implement the first Wheatstone bridge circuit WB1.

In a state in which any touch input is not applied, a multiplication of a resistance value Ra of the first pressure electrode member PIE1 and the resistance value R1 of the first resistor WBa may be substantially equal to that of the resistance value R2 of the second resistor WBb and the resistance value R3 of the third resistor WBc.

When the multiplication of the resistance value Ra of the first pressure electrode member PIE1 and the resistance value R1 of the first resistor WBa is equal to that of the resistance value R2 of the second resistor WBb and the resistance value R3 of the third resistor WBc, voltages of the first output node N3 and the second output node N4 may be equal to each other. When the voltages of the first output node N3 and the second output node N4 are equal to each other, the voltage difference between the first output node N3 and the second output node N4 may be 0 V, and the first voltage Va output by the amplifying circuit AMP may be 0 V.

When a touch input is applied to the sensor ISL, the shape of the first pressure electrode member PIE1 may be deformed depending on the strength of a touch, and the resistance value Ra of the first pressure electrode member PIE1 may be changed by the deformation of the shape of the first pressure electrode member PIE1. Accordingly, a voltage difference may occur between the first output node N3 and the second output node N4. When the voltage difference may occur between the first output node N3 and the second output node N4, the amplifying circuit AMP outputs a value instead of 0 V as the first voltage Va, and the input sensing device may detect a strength of the touch or a pressure of the touch by measuring the output value.

The second pressure detector IS-PD2 may include a second Wheatstone bridge circuit WB2. The second pressure detector IS-PD2 may further include an analog-digital converter and a processor, which detect a second voltage Vb output from the second Wheatstone bridge circuit WB2.

The second Wheatstone bridge circuit WB2 may include a third node N5, a fourth node N6, a third output node N7, and a fourth output node N8. A driving voltage Vs may be provided to the third node N5, and a fourth node N6 may be connected to the ground GND.

The second Wheatstone bridge circuit WB2 may further include a fourth resistor WBd connected to the fourth node N6 and the fourth output node N8, a fifth resistor WBe connected to the third node N5 and the fourth output node N8, and a sixth resistor WBf connected to the fourth node N6 and the third output node N7.

Each of a resistance value R4 of the fourth resistor WBd, a resistance value R5 of the fifth resistor WBe, and a resistance value R6 of the sixth resistor WBf may have a predetermined value. That is, the fourth resistor WBd to the sixth resistor WBf may be fixed resistors.

The second Wheatstone bridge circuit WB2 may further include an amplifying circuit AMP. The amplifying circuit AMP of the second Wheatstone bridge circuit WB2 may be substantially identical to the amplifying circuit AMP of the first Wheatstone bridge circuit WB1. An electrical flow between the third output node N7 and the fourth output node N8 may be sensed through the amplifying circuit AMP. That is, the amplifying circuit AMP may operate as a current detection device or voltage measurement device.

An output terminal of the amplifying circuit AMP may output the second voltage Vb in proportion to a difference between voltage values input to both input terminals.

The one end E1b of the second pressure electrode member PIE2 may be electrically connected to the third node N5 through the third pressure sensing line PSL3, and the other end E2b of the second pressure electrode member PIE2 may be connected to the third output node N7 through the fourth pressure sensing line PSL4.

The second pressure electrode member PIE2, the fourth resistor WBd, the fifth resistor WBe, and the sixth resistor WBf may be connected to each other, to implement the second Wheatstone bridge circuit WB2. The second Wheatstone bridge circuit WB2 is substantially identical or similar to the first Wheatstone bridge circuit WB1, and therefore, overlapping descriptions will not be repeated.

The electrical connection relationship between the first pressure electrode member PIE1 and the first Wheatstone bridge circuit WB1 and the electrical connection relationship between the second pressure electrode member PIE2 and the second Wheatstone bridge circuit WB2 may be variously modified.

The input sensing device ISU can detect a touch position in addition to a touch pressure through the first pressure electrode member PIE1 and the second pressure electrode member PIE2. That is, the input sensing device ISU operates the touch driver IS-TD1, to detect a touch position without operating the first electrode member IE1 and the second electrode member IE2.

Figure 26:
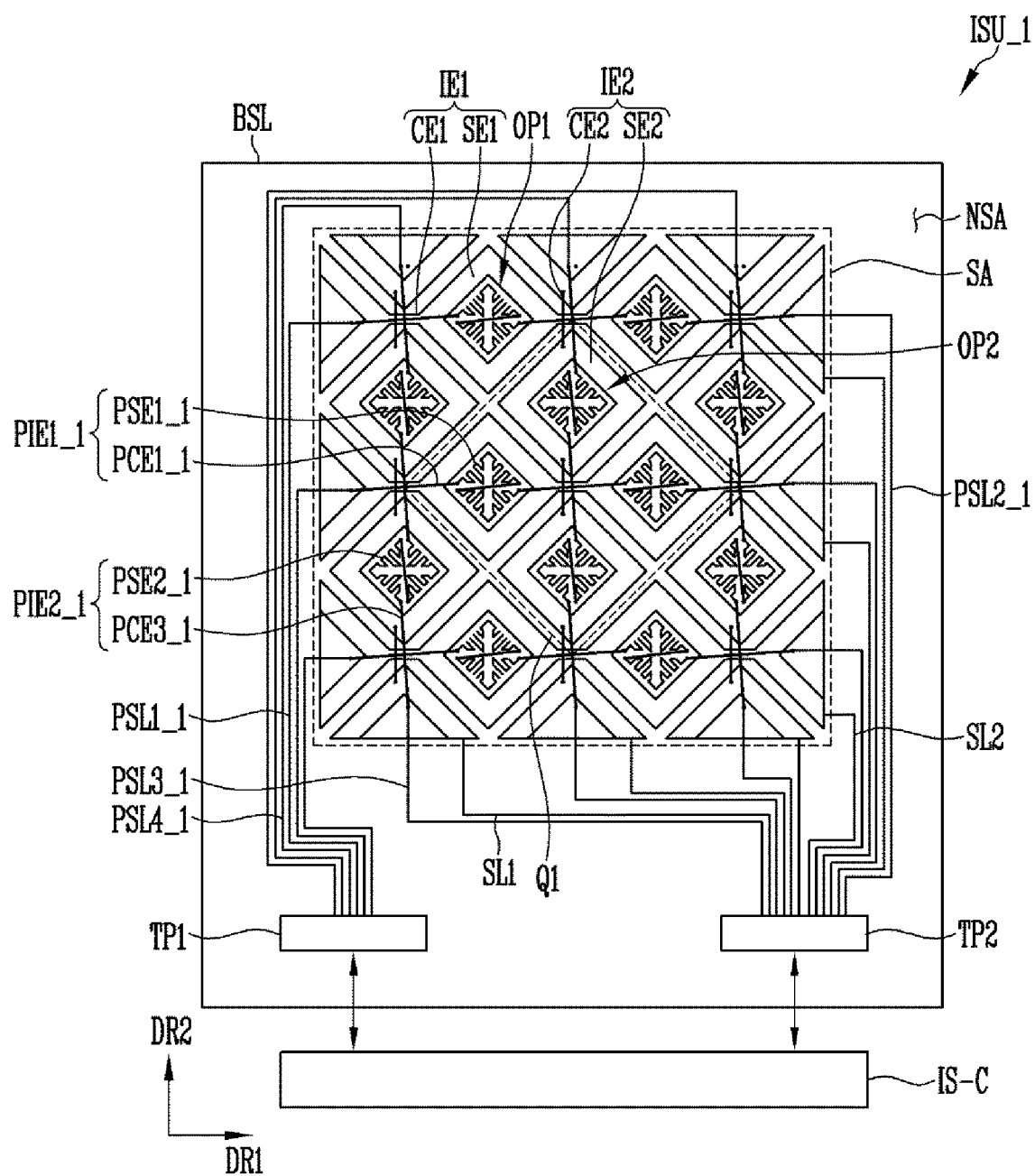
FIG. 26 is a plan view illustrating another example of the input sensing device included in the display device shown in FIG. 1.
Figure 27:
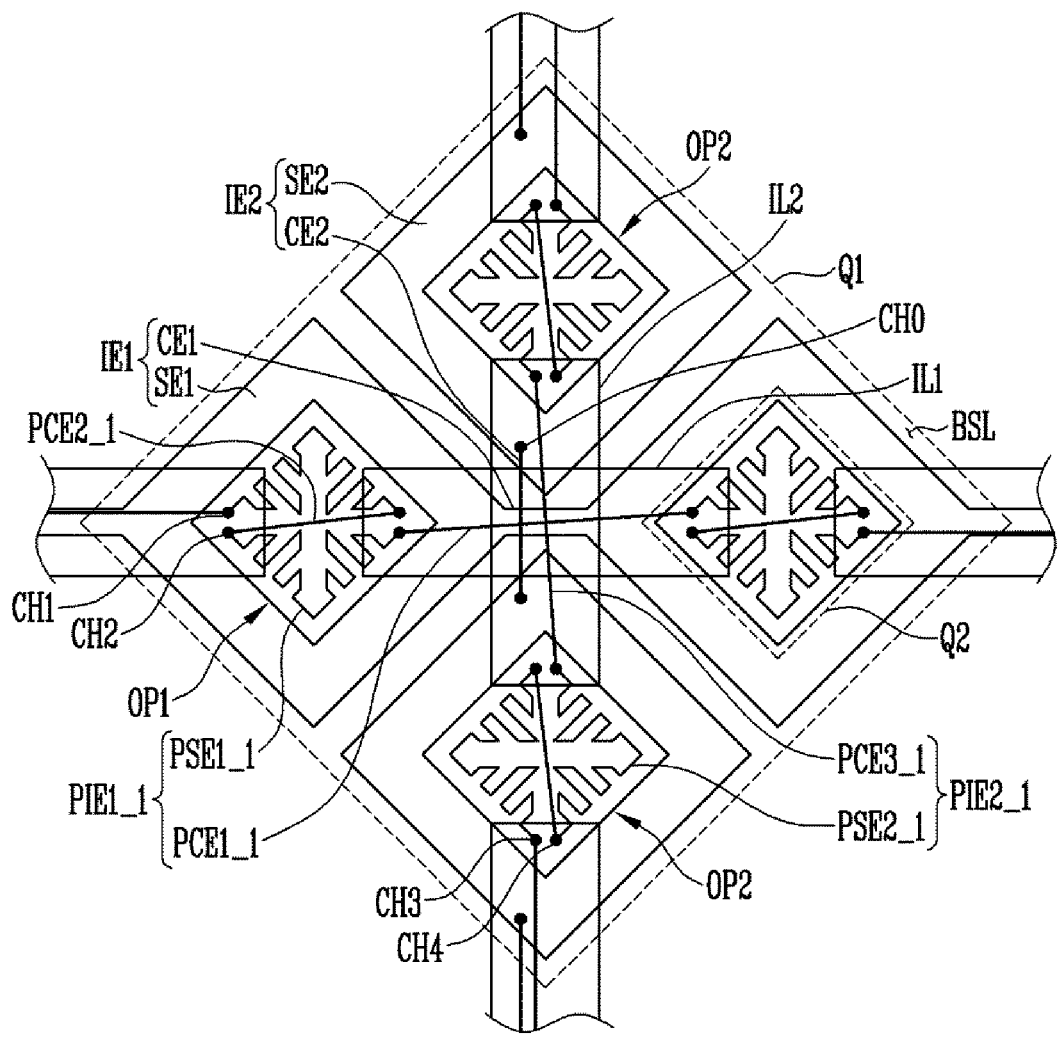
FIG. 27 is an enlarged view of portion Q1 shown in FIG. 26.
Figure 28:
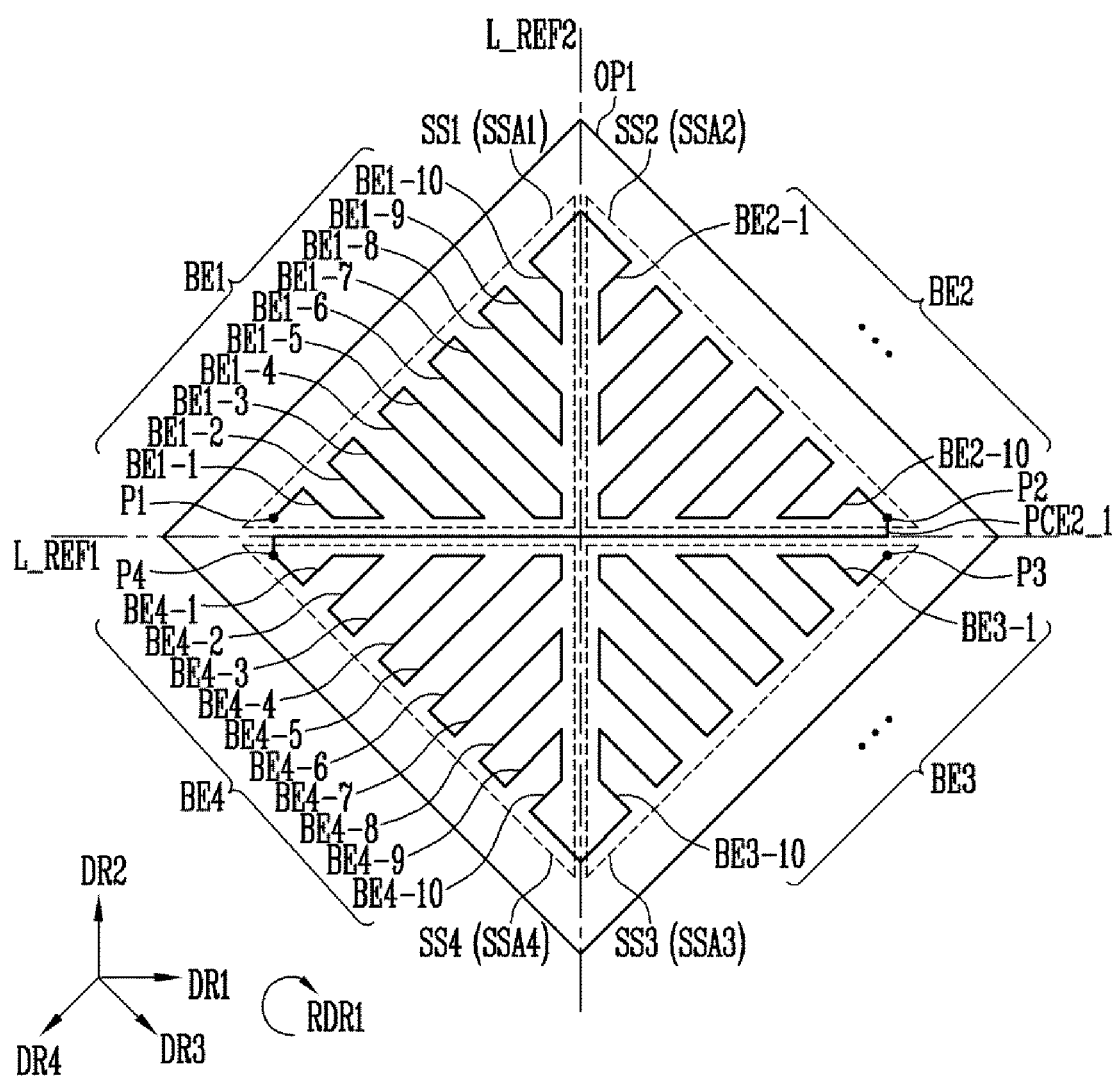
FIG. 28 is an enlarged view of portion Q2 shown in FIG. 27.
Figure 29:
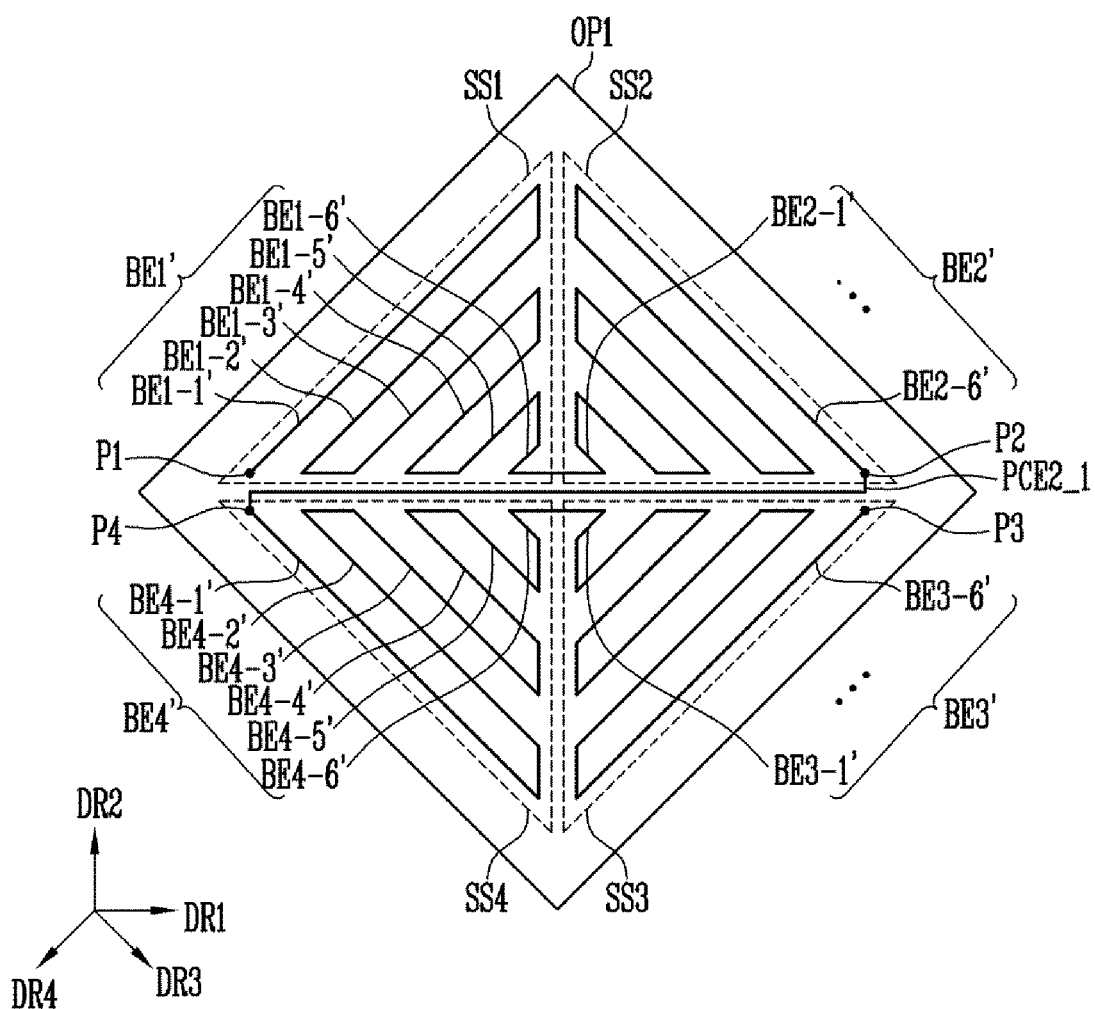
FIGS. 29 and 30 are views illustrating an example of a pressure sensing electrode shown in FIG. 28.
Figure 30:
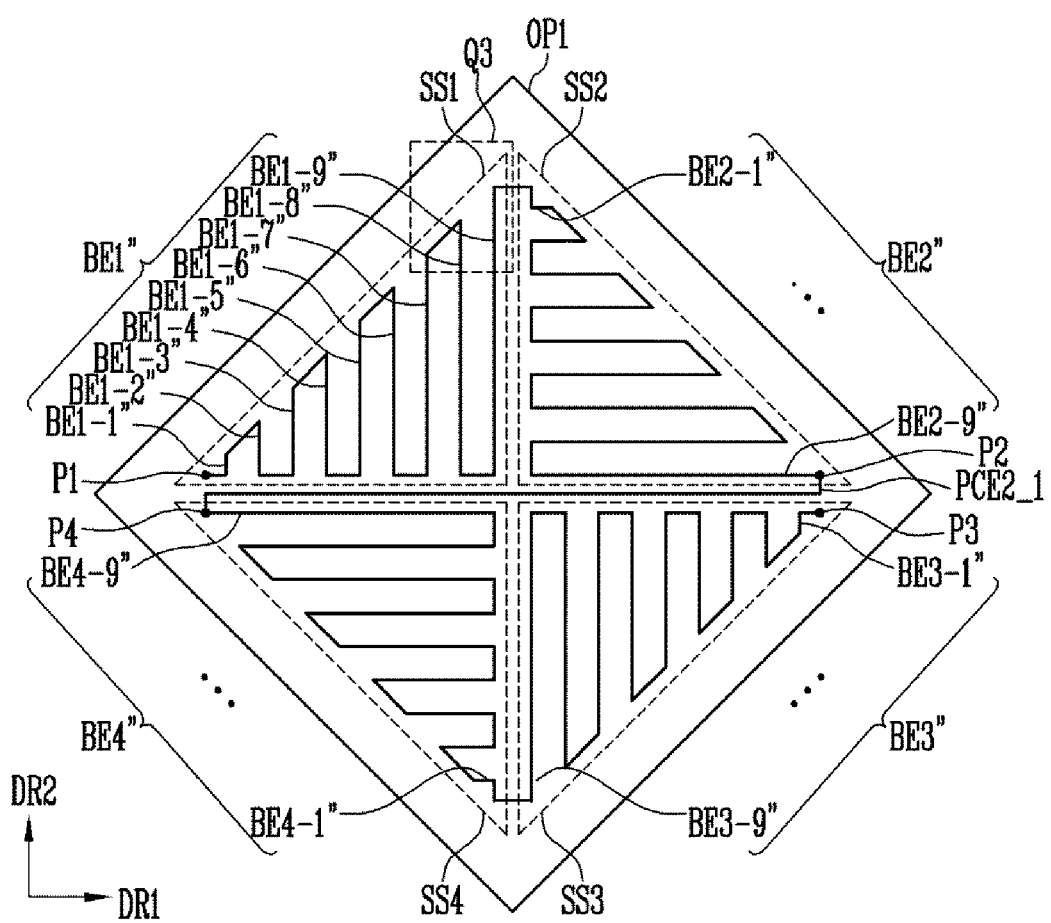

FIG. 26 is a plan view illustrating another example of the input sensing device included in the display device shown in FIG. 1. FIG. 27 is an enlarged view of portion Q1 shown in FIG. 26. FIG. 28 is an enlarged view of portion Q2 shown in FIG. 26. FIGS. 29 and 30 are views illustrating an example of a pressure sensing electrode shown in FIG. 28.

Pressure sensing electrodes corresponding to those shown in FIGS. 7 to 9 are illustrated in FIGS. 28 to 30.

Referring to FIGS. 4 to 9 and 26 to 30, the input sensing device ISU_1 shown in FIG. 26 may be substantially identical or similar to the input sensing device ISU shown in FIG. 4, except a first pressure electrode member PIE1_1, a second pressure electrode member PIE2_1, and first to fourth pressure sensing lines PSL1_1 to PSL4_1.

The pressure sensing lines PSL1_1 to PSL4_1 may include the first pressure sensing line PSL1_1 connected to one end of the first pressure electrode member PIE1_1 (or a first pressure sensing electrode PSE1_1), the second pressure sensing line PSL2_1 connected to the other end of the first pressure electrode member PIE1_1, the third pressure sensing line PSL3_1 connected to one end of the second pressure electrode member PIE2_1, and the fourth pressure sensing line PSL4_1 connected to the other end of the second pressure electrode member PIE2_1.

The first pressure electrode member PIE1_1 may include the first pressure sensing electrode PSE1_1 and a first connection pattern PCE1_1. The first pressure sensing electrode PSE1 shown in FIG. 4 is connected to an adjacent first pressure sensing electrode PSE1 through the first connection pattern PCE1 and the second connection pattern PCE2, but the first pressure sensing electrode PSE1_1 shown in FIG. 26 may be connected to an adjacent first pressure sensing electrode PSE1_1 through the first connection pattern PCE1_1.

In some exemplary embodiments, the first pressure sensing electrode PSE1_1 may include first to fourth sensing cells SS1 to SS4. The first to fourth sensing cells SS1 to SS4 are substantially identical or similar to the first to fourth sensing cells SS1 to SS4 described with reference to FIG. 7, and therefore, overlapping descriptions will not be repeated.

In an exemplary embodiment, the second sensing cell SS2 may be connected to the fourth sensing cell SS4 through a second connection pattern PCE2_1. That is, the fourth sensing cell SS4 may be connected between the second sensing cell SS2 and the third sensing cell SS3.

As shown in FIGS. 27 and 28, the second connection pattern PCE2_1 may extend in the first direction DR1 in a first opening OP1, and connect a second point P2 and a fourth point P4. The second connection pattern PCE2_1 may be integrally formed with the second sensing cell SS2 and the fourth sensing cell SS4.

The first sensing cell SS1, the second sensing cell SS2, the fourth sensing cell SS4, and the third sensing cell SS3 may be sequentially connected in series between a first point P1 and a third point P3.

As shown in FIG. 29, although the first sensing cell SS1 of the first pressure sensing electrode PSE1 includes first branch electrodes BE1' extending in the fourth direction DR4, the second connection pattern PCE2_1 may extend in the first direction DR1 in the first opening OP1, and connect the second sensing cell SS2 and the fourth sensing cell SS4.

As shown in FIG. 30, although the first sensing cell SS1 of the first pressure sensing electrode PSE1 includes first branch electrodes BE1" extending in the second direction DR2, the second connection pattern PCE2_1 may extend in the first direction DR1 in the first opening OP1, and connect the second sensing cell SS2 and the fourth sensing cell SS4.

That is, regardless of the arrangement of branch electrodes in the sensing cells SS1 to SS4, the second connection pattern PCE2_1 may connect the second sensing cell SS2 and the fourth sensing cell SS4, and the first pressure sensing electrode PSE1_1 may be connected to an adjacent first pressure sensing electrode PSE1_1 through one first connection pattern PCE1_1.

Similar to the first pressure electrode member PIE1_1, the second pressure electrode member PIE2_1 may include a second pressure sensing electrode PSE2_1 and a third connection pattern PCE3_1. The second pressure sensing electrode PSE2 shown in FIG. 4 is connected to an adjacent second pressure sensing electrode PSE2 through the third connection pattern PCE3 and the fourth connection pattern PCE4, but the second pressure sensing electrode PSE2_1 shown in FIG. 26 may be connected to an adjacent second pressure sensing electrode PSE2_1 through the third connection pattern PCE3_1.

A shape of the second pressure sensing electrode PSE2_1 is similar to that of the first pressure sensing electrode PSE1_1 described with reference to FIG. 30, and therefore, overlapping descriptions will not be repeated.

The second pressure sensing electrode PSE2_1 may have a shape in which the first pressure sensing electrode PSE1_1 is rotated by 90 degrees along the first rotational direction RDR1.

As described with reference to FIGS. 26 to 30, the first pressure sensing electrode PSE1 (and the second pressure sensing electrode PSE2) includes first to fourth sensing cells SS1 to SS4, and the first to fourth sensing cells SS1 to SS4 may include branch electrodes extending in different directions. In addition, the second sensing cell SS2 and the fourth sensing cell SS4 may be connected to each other through the second connection pattern PCE2_1, and the first pressure sensing electrode PSE1_1 may be connected to an adjacent first pressure sensing electrode PSE1_1 through one first connection pattern PCE1_1.

In accordance with the present invention, the display device may include a first sensing electrode, a second sensing electrode, a first pressure sensing electrode, and a second pressure sensing electrode, which are disposed in the same layer. Thus, a manufacturing process of the input sensing device and the display device can be simplified, and the input sensing device can be implemented in a thin type while having a function of pressure sensing.

Further, the first pressure sensing electrode may include first to fourth sensing cells, and the first to fourth sensing cells may include branch electrodes extending in different directions. Thus, a phenomenon in which the first pressure sensing electrode is viewed (and a phenomenon in which image quality is reduced due to the phenomenon) can be prevented, and the recognition accuracy of a touch pressure can be improved.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An input sensing device comprising:
   a base layer;
   a first electrode member including first sensing electrodes arranged along a first direction on the base layer, the first sensing electrodes being electrically connected to each other along the first direction, each of the first sensing electrodes including a first opening exposing the base layer;
   a second electrode member including second sensing electrodes arranged along a second direction intersecting the first direction on the base layer, the second sensing electrodes being electrically connected to each other along the second direction; and a first pressure sensing electrode disposed in the first opening, the first pressure sensing electrode being insulated from the first sensing electrodes and the second sensing electrodes, wherein:

the first sensing electrodes, the second sensing electrodes, and the first pressure sensing electrode are disposed at a same layer;

the first pressure sensing electrode includes a first sensing cell, a second sensing cell, a third sensing cell, and a fourth sensing cell;

the first sensing cell includes first branch electrodes each extending in a third direction, the first branch electrodes being arranged in parallel with each other;

the second sensing cell includes second branch electrodes each extending in a fourth direction intersecting the third direction, the second branch electrodes being arranged in parallel with each other;

the third sensing cell includes third branch electrodes each extending in the third direction, the third branch electrodes being arranged in parallel with each other;

the fourth sensing cell includes fourth branch electrodes each extending in the fourth direction, the fourth branch electrodes being arranged in parallel with each other;

the first sensing cell and the second sensing cell are connected to each other in series;

the third sensing cell and the fourth sensing cell are connected to each other in series; and in the first opening, the third sensing cell and the fourth sensing cell are not connected to the first sensing cell and the second sensing cell.

2. The input sensing device of claim 1, wherein:

the first branch electrodes are connected in series to each other in the first sensing cell; and the second branch electrodes are connected in series to each other in the second sensing cell.

3. The input sensing device of claim 1, wherein:

the third direction intersects each of the first direction and the second direction; and the fourth direction intersects each of the first direction, the second direction, and the third direction.

4. The input sensing device of claim 3, wherein the fourth direction is substantially perpendicular to the third direction.

5. The input sensing device of claim 1, wherein:

the first opening includes first to fourth cell regions distinguished from each other by a first reference line and a second reference line, which pass an area center of the first pressure sensing electrode; and the first to fourth sensing cells are respectively disposed in the first to fourth cell regions.

6. The input sensing device of claim 5, wherein the first to fourth sensing cells are sequentially located along a first rotational direction with respect to the area center.

7. The input sensing device of claim 5, wherein the third sensing cell and the fourth sensing cell are respectively symmetrical with the second sensing cell and the first sensing cell with respect to the first reference line or the second reference line.

8. The input sensing device of claim 1, wherein the third sensing cell is connected to the second sensing cell through an adjacent pressure sensing electrode adjacent to the first pressure sensing electrode.

9. The input sensing device of claim 1, wherein the fourth sensing cell is connected between the second sensing cell and the third sensing cell.

10. The input sensing device of claim 1, further comprising a second pressure sensing electrode disposed in a second opening of each of the second sensing electrodes, the second pressure sensing electrode being insulated from the first sensing electrodes and the second sensing electrodes, wherein the second pressure sensing electrode includes the first sensing cell and the second sensing cell.

11. The input sensing device of claim 1, wherein the third direction is identical to the first direction, and the fourth direction is identical to the second direction.

12. The input sensing device of claim 11, wherein:

the first pressure sensing electrode further includes a third sensing cell and a fourth sensing cell;

the third sensing cell includes third branch electrodes each extending in the third direction, the third branch electrodes being arranged in parallel with each other;

the fourth sensing cell includes fourth branch electrodes each extending in the fourth direction, the fourth branch electrodes being arranged in parallel with each other; and the first to fourth sensing cells are rotationally symmetrical with each other with respect to an area center of the first opening.

13. The input sensing device of claim 1, further comprising:

a first conductive layer disposed on the base layer;

a second conductive layer disposed on the first conductive layer; and a third conductive layer disposed on the second conductive layer, wherein:

the first conductive layer includes the first electrode member, the second electrode member, the first pressure sensing electrode, and a first connection electrode connecting two adjacent first sensing electrodes among the first sensing electrodes;

the second conductive layer includes a second connection electrode connecting two adjacent second sensing electrodes among the second sensing electrodes; and the third conductive layer includes first and second connection patterns connecting the first pressure sensing electrode to an adjacent pressure sensing electrode adjacent to the first pressure sensing electrode.

14. The input sensing device of claim 13, wherein:

the first sensing cell of the first pressure sensing electrode is connected to a first sensing cell of the adjacent pressure sensing electrode through the first connection pattern; and the second sensing cell of the first pressure sensing electrode is connected to a second sensing cell of the adjacent pressure sensing electrode through the second connection pattern.

15. The input sensing device of claim 1, further comprising:

a first conductive layer disposed on the base layer;

a second conductive layer disposed on the first conductive layer; and a third conductive layer disposed on the second conductive layer, wherein:

the first conductive layer includes the first electrode member, the second electrode member, the first pressure sensing electrode, and a first connection electrode connecting the first sensing electrodes;

the second conductive layer includes a first connection pattern connecting the first pressure sensing electrode to an adjacent pressure sensing electrode adjacent to the first pressure sensing electrode; and the third conductive layer includes a second connection electrode connecting the second sensing electrodes.

16. The input sensing device of claim 1, further comprising:

a first conductive layer disposed on the base layer;

a second conductive layer disposed on the first conductive layer; and a third conductive layer disposed on the second conductive layer, wherein:

the first conductive layer includes the first electrode member, the second electrode member, a first connection electrode connecting two adjacent first sensing electrodes among the first sensing electrodes, and the first pressure sensing electrode;

the second conductive layer includes a second connection electrode connecting two adjacent second sensing electrodes among the second sensing electrodes; and the third conductive layer includes a first connection pattern connecting the first pressure sensing electrode to an adjacent pressure sensing electrode adjacent to the first pressure sensing electrode.

17. A display device comprising:

a base substrate;

a light emitting element disposed on the base substrate;

a thin film encapsulation disposed over the light emitting element; and a first electrode layer disposed on the thin film encapsulation, wherein:

the first electrode layer includes:

a first electrode member including first sensing electrodes arranged along a first direction, the first sensing electrodes being electrically connected to each other along the first direction, each of the first sensing electrodes including a first opening exposing the base substrate;

a second electrode member including second sensing electrodes arranged along a second direction intersecting the first direction, the second sensing electrodes being electrically connected to each other along the second direction; and a first pressure sensing electrode disposed in the first opening, the first pressure sensing electrode being insulated from the first sensing electrodes and the second sensing electrodes;

the first sensing electrodes, the second sensing electrodes, and the first pressure sensing electrode are disposed at a same layer;

the first pressure sensing electrode includes a first sensing cell, a second sensing cell, a third sensing cell, and a fourth sensing cell;

the first sensing cell includes first branch electrodes each extending in a third direction, the first branch electrodes being arranged in parallel with each other; and the second sensing cell includes second branch electrodes each extending in a fourth direction intersecting the third direction, the second branch electrodes being arranged in parallel with each other;

the third sensing cell includes third branch electrodes each extending in the third direction, the third branch electrodes being arranged in parallel with each other;

the fourth sensing cell includes fourth branch electrodes each extending in the fourth direction, the fourth branch electrodes being arranged in parallel with each other;

the first sensing cell and the second sensing cell are connected to each other in series;

the third sensing cell and the fourth sensing cell are connected to each other in series; and in the first opening, the third sensing cell and the fourth sensing cell are not connected to the first sensing cell and the second sensing cell.

* * * * *